United States Patent
Fu

(10) Patent No.: US 10,275,813 B2
(45) Date of Patent: Apr. 30, 2019

(54) METHOD AND SYSTEM FOR PROVIDING A TRANSACTION PLATFORM FOR PRE-OWNED MERCHANDISE

(71) Applicant: Alibaba Group Holding Limited, George Town, Grand Cayman (KY)

(72) Inventor: Lubin Fu, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 410 days.

(21) Appl. No.: 14/739,871

(22) Filed: Jun. 15, 2015

(65) Prior Publication Data
US 2016/0012503 A1    Jan. 14, 2016

(30) Foreign Application Priority Data
Jul. 8, 2014   (CN) .......................... 2014 1 0324408

(51) Int. Cl.
*G06Q 30/00* (2012.01)
*G06Q 30/06* (2012.01)
*G06Q 50/00* (2012.01)

(52) U.S. Cl.
CPC ..... *G06Q 30/0611* (2013.01); *G06Q 30/0613* (2013.01); *G06Q 50/01* (2013.01)

(58) Field of Classification Search
CPC ........ G06Q 30/06; G06Q 40/00; G06Q 10/00; G06Q 30/0611
USPC ......................................... 705/26.4, 37, 343
See application file for complete search history.

(56) References Cited

U.S. PATENT DOCUMENTS

| | | | |
|---|---|---|---|
| 4,281,391 A | 7/1981 | Huang |
| 6,526,166 B1 | 2/2003 | Gorman |
| 6,697,947 B1 | 2/2004 | Matyas, Jr. |
| 6,726,094 B1 | 4/2004 | Rantze |
| 7,149,720 B2 | 12/2006 | Shepherd |
| 7,321,874 B2 | 1/2008 | Dilip |
| 7,734,527 B2 | 6/2010 | Uzo |
| 7,809,636 B1 | 10/2010 | Jou |
| 7,809,762 B1 | 10/2010 | Parker |
| 7,941,760 B2 | 5/2011 | Kocienda |
| 7,946,474 B1 | 5/2011 | Agrawal |

(Continued)

FOREIGN PATENT DOCUMENTS

| CN | 201498035 | 6/2010 |
|---|---|---|
| DE | 102004047258 | 4/2006 |

(Continued)

*Primary Examiner* — Oluseye Iwarere
(74) *Attorney, Agent, or Firm* — Shun Yao; Park, Vaughan, Fleming & Dowler LLP

(57) ABSTRACT

One embodiment of the present invention provides a system for facilitating trading of pre-owned merchandise. During operation, the system receives, at a server, recycle information associated with an item that a first user intends to purchase and stores the recycle information and identification information of the first user in a database. The recycle information specifies identification and price information associated with the item. The system receives, from a second user, a request for an offer price for a for-sale item. The system then queries the database to identify one or more users who intend to purchase the for-sale item, calculates offer prices provided by the identified users for the for-sale item, and provides a list of the identified users and the calculated offer prices to the second user.

17 Claims, 15 Drawing Sheets

(56) References Cited

U.S. PATENT DOCUMENTS

| | | | |
|---|---|---|---|
| 7,978,900 B2 | 7/2011 | Nepomniachtchi | |
| 8,090,642 B1 * | 1/2012 | Van Doren | G06Q 40/00 705/35 |
| 8,176,324 B1 | 5/2012 | Krishnamurthy | |
| 8,280,782 B1 | 10/2012 | Talreja | |
| 8,423,392 B2 | 4/2013 | Moxley | |
| 8,423,467 B1 | 4/2013 | Johansson | |
| 8,645,295 B1 * | 2/2014 | Dillard | G06Q 30/02 705/7.29 |
| 9,111,073 B1 | 8/2015 | Jiang | |
| 9,239,722 B1 | 1/2016 | Calahan | |
| 9,621,348 B2 | 4/2017 | Bahjat | |
| 2002/0111916 A1 | 8/2002 | Coronna | |
| 2002/0161466 A1 | 10/2002 | Heching | |
| 2003/0042301 A1 | 3/2003 | Rajasekaran | |
| 2003/0061172 A1 | 3/2003 | Robinson | |
| 2003/0200190 A1 | 10/2003 | Adar | |
| 2004/0139008 A1 | 7/2004 | Mascavage | |
| 2004/0153407 A1 | 8/2004 | Clubb | |
| 2005/0038707 A1 | 2/2005 | Roever | |
| 2005/0071637 A1 | 3/2005 | Shirakawa | |
| 2005/0075954 A1 | 4/2005 | Matsumoto | |
| 2005/0113123 A1 | 5/2005 | Torvinen | |
| 2005/0144406 A1 | 6/2005 | Chong, Jr. | |
| 2005/0170856 A1 | 8/2005 | Keyani | |
| 2005/0240935 A1 | 10/2005 | Ramanathan | |
| 2006/0010190 A1 | 1/2006 | Shimbo | |
| 2006/0056626 A1 | 3/2006 | Keohane | |
| 2006/0069635 A1 * | 3/2006 | Ram | G06Q 30/08 705/37 |
| 2006/0089897 A1 | 4/2006 | Maas | |
| 2006/0176847 A1 | 8/2006 | Chen | |
| 2006/0220842 A1 | 10/2006 | Breed | |
| 2006/0271783 A1 | 11/2006 | Wong | |
| 2007/0035617 A1 | 2/2007 | Ko | |
| 2007/0043651 A1 * | 2/2007 | Xiao | G06Q 30/08 705/37 |
| 2007/0276730 A1 * | 11/2007 | Lee | G06Q 30/02 705/14.27 |
| 2008/0004981 A1 * | 1/2008 | Gopalpur | G06Q 20/203 705/26.81 |
| 2008/0077542 A1 | 3/2008 | McElhiney | |
| 2008/0097805 A1 | 4/2008 | Wells | |
| 2008/0119160 A1 | 5/2008 | Andriantsiferana | |
| 2008/0120160 A1 * | 5/2008 | Woo | G06Q 10/087 705/14.72 |
| 2008/0182586 A1 | 7/2008 | Aaron | |
| 2008/0228595 A1 | 9/2008 | Hill | |
| 2008/0306839 A1 | 12/2008 | Starrs | |
| 2009/0076926 A1 * | 3/2009 | Zinberg | G06Q 30/0601 705/26.1 |
| 2009/0090772 A1 | 4/2009 | Lee | |
| 2009/0106825 A1 | 4/2009 | Cerruti | |
| 2009/0144451 A1 | 6/2009 | Cabezas et al. | |
| 2009/0157522 A1 * | 6/2009 | Srinivasan | G06Q 30/00 705/26.1 |
| 2009/0195506 A1 | 8/2009 | Geidl | |
| 2010/0060585 A1 | 3/2010 | Chiu | |
| 2010/0073302 A1 | 3/2010 | Ritzau | |
| 2010/0088026 A1 | 4/2010 | Manolescu | |
| 2010/0162036 A1 | 6/2010 | Linden | |
| 2010/0191648 A1 | 7/2010 | Smith | |
| 2010/0210240 A1 | 8/2010 | Mahaffey | |
| 2010/0223543 A1 | 9/2010 | Marston | |
| 2010/0235283 A1 | 9/2010 | Gerson | |
| 2010/0241575 A1 * | 9/2010 | Cotton | G06Q 20/12 705/80 |
| 2010/0250436 A1 | 9/2010 | Loevenguth | |
| 2011/0016520 A1 | 1/2011 | Cohen | |
| 2011/0093493 A1 | 4/2011 | Nair | |
| 2011/0125616 A1 | 5/2011 | Ni | |
| 2011/0184840 A1 | 7/2011 | Godard | |
| 2011/0231465 A1 | 9/2011 | Phatak | |
| 2011/0258027 A1 * | 10/2011 | Lee | G06Q 30/02 705/14.23 |
| 2011/0264598 A1 * | 10/2011 | Fuxman | G06Q 30/0281 705/343 |
| 2012/0016799 A1 | 1/2012 | Killian | |
| 2012/0076283 A1 | 3/2012 | Ajmera | |
| 2012/0101942 A1 | 4/2012 | Park | |
| 2012/0117271 A1 | 5/2012 | Kennedy | |
| 2012/0143924 A1 * | 6/2012 | Sethi | G06F 17/30536 707/803 |
| 2012/0158467 A1 | 6/2012 | Hammad | |
| 2012/0204256 A1 | 8/2012 | Craine | |
| 2012/0259774 A1 | 10/2012 | Marti | |
| 2012/0259783 A1 | 10/2012 | Kemper | |
| 2012/0299831 A1 | 11/2012 | Lioy | |
| 2012/0323846 A1 | 12/2012 | Bai | |
| 2013/0066889 A1 | 3/2013 | Rodriguez | |
| 2013/0094751 A1 | 4/2013 | Nepomniachtchi | |
| 2013/0110670 A1 | 5/2013 | Webber | |
| 2013/0232071 A1 | 9/2013 | Dilip | |
| 2013/0246172 A1 * | 9/2013 | Moissinac | G06Q 30/02 705/14.52 |
| 2013/0311532 A1 | 11/2013 | Olsen | |
| 2013/0317895 A1 | 11/2013 | Turner | |
| 2013/0331130 A1 | 12/2013 | Lee | |
| 2014/0037184 A1 | 2/2014 | Gorski | |
| 2014/0052636 A1 | 2/2014 | Mattes | |
| 2014/0156512 A1 | 6/2014 | Rahman | |
| 2014/0162698 A1 | 6/2014 | Han | |
| 2014/0164109 A1 * | 6/2014 | Chow | G06Q 30/0255 705/14.53 |
| 2014/0236801 A1 * | 8/2014 | Hansen | G06Q 10/087 705/37 |
| 2014/0279525 A1 | 9/2014 | Mohsenzadeh | |
| 2014/0280910 A1 | 9/2014 | Swig | |
| 2014/0306896 A1 | 10/2014 | Sosby | |
| 2014/0310171 A1 | 10/2014 | Grossman | |
| 2015/0066679 A1 * | 3/2015 | Mack | G06Q 30/0613 705/26.4 |
| 2015/0186989 A1 * | 7/2015 | Kneen | G06Q 30/08 705/26.3 |
| 2015/0220876 A1 * | 8/2015 | Sethi | G06F 17/30536 707/727 |
| 2015/0235477 A1 | 8/2015 | Simkin | |
| 2015/0356288 A1 | 12/2015 | Guo | |
| 2015/0379460 A1 * | 12/2015 | Zamer | G06Q 10/087 705/26.1 |
| 2016/0012503 A1 * | 1/2016 | Fu | G06Q 30/0611 705/26.4 |
| 2016/0077734 A1 | 3/2016 | Buxton | |
| 2017/0270598 A1 * | 9/2017 | Ram | G06Q 30/08 |

FOREIGN PATENT DOCUMENTS

| | | |
|---|---|---|
| EP | 0992949 | 4/2000 |
| EP | 1067471 | 1/2001 |
| JP | 10240690 | 9/1998 |
| JP | 2000082101 | 3/2000 |
| JP | 2001297283 | 10/2001 |
| JP | 2003271851 | 9/2003 |
| JP | 2006259854 | 9/2006 |
| JP | 2008532112 | 8/2008 |
| JP | 2009020676 | 1/2009 |
| JP | 2014515149 | 6/2014 |
| KR | 1020020057906 | 7/2002 |
| WO | 2012045128 | 4/2012 |
| WO | 2013003372 | 1/2013 |
| WO | 2013149883 | 10/2013 |
| WO | 2017080768 | 5/2017 |

* cited by examiner

| User ID | Item ID | Baseline Price (yuan) | Price-adjustment formula |
|---|---|---|---|
| First User A | Item 1 | 1000 | Formula 1 |
| First User B | Item 1 | 1100 | Formula 2 |
| First User B | Item 2 | 1200 | Formula 3 |
| First User B | Item 3 | 1000 | Formula 4 |
| ... | ... | ... | ... |

FIG. 4A

| User ID | Item ID | Baseline Price (yuan) | Price-adjustment formula | Recycling Condition |
|---|---|---|---|---|
| First User A | Item 1 | 1000 | Formula 1 | Condition 1 |
| First User B | Item 1 | 1100 | Formula 2 | Condition 2, Condition 3 |
| First User B | Item 2 | 1200 | Formula 3 | Condition 4 |
| First User B | Item 3 | 1000 | Formula 4 | Condition 5, Condition 6, Condition 7 |
| ... | ... | ... | ... | ... |

FIG. 4B

| APPLICATION ID | DEVICE IDENTIFICATION INFO |
|---|---|
| A | DEVICE 1 |
| B | DEVICE 2 |
| C | DEVICE 3 |
| ... | ... |

FIG. 9A

| DOWNLOAD ADDRESS | DEVICE IDENTIFICATION INFO |
|---|---|
| ADDRESS FOR APP A | DEVICE 1 |
| ADDRESS FOR APP B | DEVICE 2 |
| ADDRESS FOR APP C | DEVICE 3 |
| ... | ... |

FIG. 9B

| DOWNLOAD ADDRESS | APPLICATION ID | DEVICE IDENTIFICATION INFO |
|---|---|---|
| ADDRESS FOR APP A | A | DEVICE 1 |
| ADDRESS FOR APP B | B | DEVICE 2 |
| ADDRESS FOR APP C | C | DEVICE 3 |
| ... | | ... |

FIG. 9C

METHOD AND SYSTEM FOR PROVIDING A TRANSACTION PLATFORM FOR PRE-OWNED MERCHANDISE

RELATED APPLICATION

Under 35 U.S.C. 119, this application claims the benefit and right of priority of Chinese Patent Application No. 201410324408.4, filed 8 Jul. 2014.

BACKGROUND

Field

The present application relates to a method and a system for providing a transaction platform that facilitates trading of pre-owned merchandise.

Related Art

With the rapid development of the manufacturing technology, costs of mobile devices, such as cell phones, smartphones, tablet computers, etc., have decreased continuously, thus leading to the prevalence of mobile devices among populations. In recent years, global sales of the mobile devices account for hundreds of millions. In the meantime, the continuous innovation on mobile device technologies prompts many users to own multiple devices of the same type at the same time. For example, a user may purchase an iPhone® (registered trademark of Apple Inc. of Cupertino, Calif.) of the latest version while still owning one of the previous version. Many of the previously owned mobile devices can be recycled or resold. In addition, some non-operational devices may urgently need proper disposal. Improper handling of these pre-owned devices may result in resource waste and sometimes severe environmental damages.

In order to effectively recycle the pre-owned mobile devices and to properly dispose the non-operational devices, recycling services for mobile devices have appeared to play an important role in the handling of the pre-owned devices. In general, during a sale transaction, the final price of a pre-owned device is negotiated between the seller (owner of the pre-owned device) and the buyer (the recycler), with the main price-determination factor being the overall condition of the device. However, such a process has been proved to be too subjective, with the device owner often suspicious of the price offered by the buyer. The lacking of a scientific and rational pricing mechanism for pre-owned devices can lead to mistrust between the sellers and the buyers. Specifically, during a transaction between the recycler and the owner of a pre-owned device, bargaining is often performed based on past experiences or subjective judgments, and malicious attempts to suppress the resale price of the device can occur, resulting in the lack of trust by many device owners toward the recycling services. Correspondingly, the recyclers also face some obstacles when providing the recycling services, such as attracting sellers or obtaining truthful device information from the sellers.

With the rapid development of the Internet technologies, various applications have emerged to allow a user to publish information regarding selling his pre-owned devices, thus enabling other users to contact the user to purchase the device after seeing the information. For example, a user may place an ad on an online bulletin boarding regarding a for-sale item. However, in these conventional approaches, a seller is often unable to accurately price his own pre-owned device based on the current market value, and hence, often fails to present an appropriate asking price when placing the ad. In addition, in such scenarios, an agreement between the seller and the purchaser is often hard to reach. As a result, the pre-owned device is unlikely to be resold or transferred. Considering that certain network resources have been used for publishing the device information, when the transaction eventually fails after negotiation, the published information becomes useless and the used network resources are waste.

In summary, it is desired to provide a web-based service that effectively facilitates transactions of pre-owned merchandise with an enhanced success rate, thus reducing possible waste of network resources caused by publishing useless recycle information.

SUMMARY

One embodiment of the present invention provides a system for facilitating trading of pre-owned merchandise. During operation, the system receives, at a server, recycle information associated with an item that a first user intends to purchase and stores the recycle information and identification information of the first user in a database. The recycle information specifies identification and price information associated with the item. The system receives, from a second user, a request for an offer price for a for-sale item. The system then queries the database to identify one or more users who intend to purchase the for-sale item, calculates offer prices provided by the identified users for the for-sale item, and provides a list of the identified users and the calculated offer prices to the second user.

In a variation on this embodiment, the price information associated with the item includes a baseline price and attribute-specific price information associated with at least one attribute of the item, and the attribute-specific information includes one of: a binary judging condition and a numeric price-adjusting factor.

In a further variation, the price information further includes a price-calculation formula. Calculating an offer price for an item with specific attribute values involves substituting appropriate price-adjusting factors corresponding to the specific attribute values in the price-calculation formula.

In a variation on this embodiment, receiving the recycle information further comprises: receiving, via a user interface provided to the first user, an option selected from at least one option groups presented on the user interface; and receiving, from the first user, a price-adjusting input corresponding to the selected option. The option group corresponds to an attribute, and the option selection corresponds to a specific value of the attribute.

In a variation on this embodiment, the system determines identification information associated with the for-sale item. Determining the identification involves running an application to obtain the identification information associated with the for-sale item, in response to the for-sale item being machine-accessible.

In a variation on this embodiment, the system determines a value associated with at least one attribute of the for-sale item.

In a further embodiment, determining the value associated with the attribute of the for-sale item involves running an application to obtain the value associated with the attribute, in response to the for-sale item being machine-accessible.

In a further embodiment, calculating offer prices provided by the identified users involves, for each indentified user, obtaining, from the database, price information provided by the identified user. The price information includes a baseline price and a price-adjusting factor that is specific to the value associated with the attribute. The system calculates an offer price provided by the identified user based on both the baseline price and the price-adjusting factor.

In a variation on this embodiment, providing the list of the identified users further includes ranking the identified one or more users.

In a variation on this embodiment, the system assembles a set of attributes based on noticeable attributes specified by the identified users, and determines a set of option groups to be presented on a user interface for the second user. A respective option group corresponds to a noticeable attribute, and options within the option group correspond to possible values of the noticeable attribute, thereby facilitating the second user to specify a value of the noticeable attribute for the for-sale item.

BRIEF DESCRIPTION OF THE FIGURES

To illustrate technical solutions provided by embodiments of the present application or in the prior art more clearly, a brief introduction on the accompanying drawings is given below. These drawings merely illustrate some of the exemplary embodiments of the present application, construing no limitation to the present application.

FIG. 4A presents a diagram illustrating exemplary entries in the recycle information database, in accordance with an embodiment of the present invention.

FIG. 4B presents a diagram illustrating exemplary entries in the recycle information database, in accordance with an embodiment of the present invention.

FIG. 9A presents a diagram illustrating exemplary entries in the application software database, in accordance with an embodiment of the present invention.

FIG. 9B presents a diagram illustrating exemplary entries in the application software database, in accordance with an embodiment of the present invention.

FIG. 9C presents a diagram illustrating exemplary entries in the application software database, in accordance with an embodiment of the present invention.

In the figures, like reference numerals refer to the same figure elements.

DETAILED DESCRIPTION

A clear and complete description of technical solutions in the embodiments of the present application will be given below, in combination with the accompanying drawings in the embodiments of the present application. It is clear that the embodiments described below are merely a part, but not all, of the embodiments of the present application. All of other embodiments, obtained by those of ordinary skill in the art based on the embodiments of the present application, fall into the protection scope of the present application.

Overview

Embodiments of the present invention provide a transaction platform that enables trading of pre-owned merchandise. More specifically, the transaction platform includes a recycle information database that allows recycle service providers (usually buyers of pre-owned merchandise) to provide, via the platform, recycle information of pre-owned items they intend to purchase. The recycle information of an item can include the item identification information and price information, which can be specific to attribute values of the item. A seller of a particular pre-owned device can also access the transaction platform to inquire for price offers for his device with specific attribute values. The system queries the recycle information database to identify a list of potential buyers and obtain the price information offered by the buyers. The system then calculates, based on the specific attribute values of the item and the attribute-specific price information provided by the potential buyers, offer prices of the potential buyers for the item. The seller can then either determine a sale price for the item based on the price offers, or select a buyer from the list to sell the item. Because the buyers set offer prices ahead of time, the pricing process is more objective. Moreover, the platform provides the opportunity for a seller to see offers from multiple potential buyers, thus increasing the seller's confidence level on the fairness of the price and the possibility of a successful sale. The platform additionally provides ways for automatically obtaining attribute values of the pre-owned item and for testing performance of certain hardware modules within the item, thus reducing the possibility of the seller attempting to provide false device information or sell counterfeit products.

A large number of users, including both sellers and buyers, generally exist in use the transaction platform. The large user number and their diverse demands increase the likelihood of establishing a supply-demand chain for pre-owned merchandise. Recycle service providers can solicit sellers of pre-owned items by publishing recycle information through the platform; and sellers of pre-owned items can inquire price offers for their items. The transaction platform acts as a bridge, which provides information acquiring and publishing interfaces, between buyers and sellers of the pre-owned merchandise items.

Figure 1:
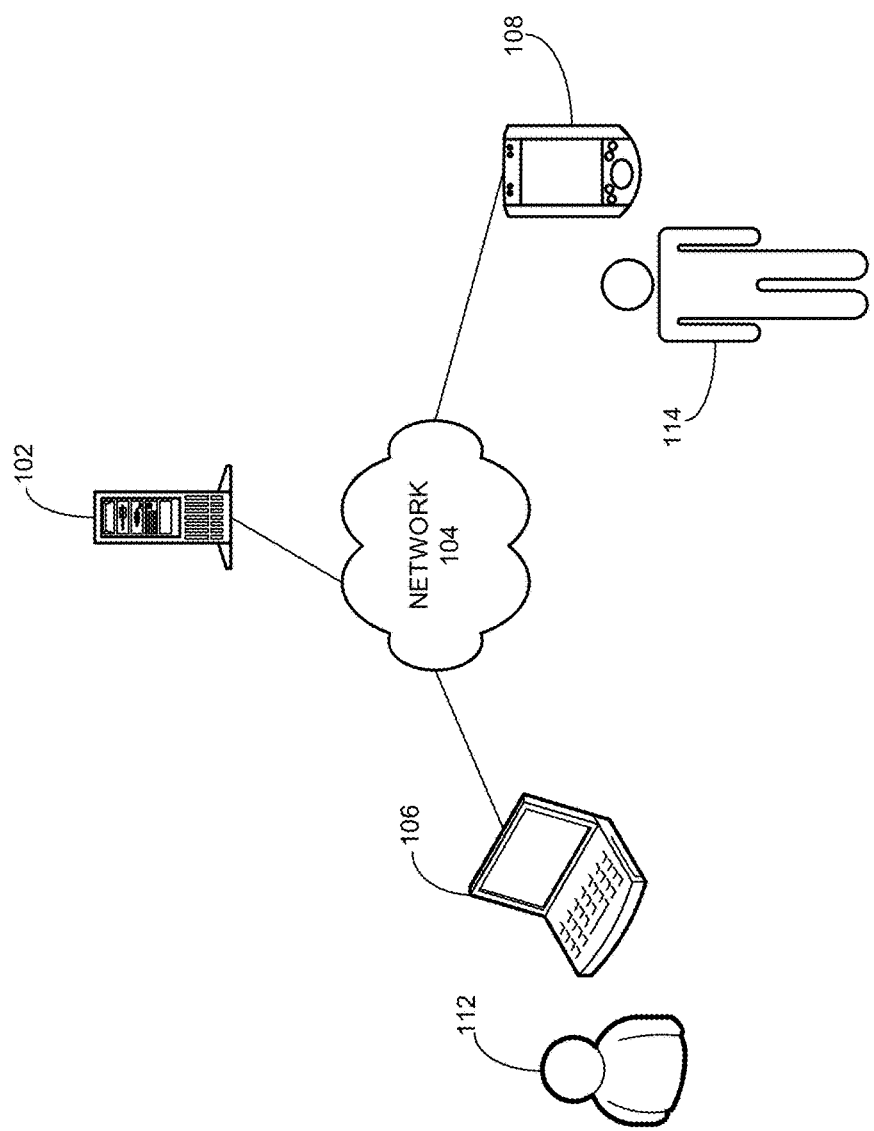
FIG. 1 presents a diagram illustrating an exemplary transaction system of pre-owned merchandise, in accordance with an embodiment of the present invention.

FIG. 1 presents a diagram illustrating an exemplary pre-owned merchandise transaction system, in accordance with an embodiment of the present invention. In FIG. 1, a pre-owned merchandise transaction system 100 includes a server 102 hosting a transaction platform, a network 104, and a number of client computers, such as a laptop computer 106 and a smartphone 108, coupled to server 102 via network 104. During operation, a number of users can access the transaction platform via the client computers. For example, a user 112 can access the transaction platform via laptop computer 106, and a user 114 can access the transaction platform via smartphone 108.

During operation, a recycle service provider, a recycler, or a consumer of pre-owned merchandise, may input, to the transaction platform, specific information associated with merchandise items, such as merchandise type, make, model, serial number, hardware configuration, usage history, condition, corresponding price quote, etc., that he intend to purchase. The transaction platform saves such information in a database. On the other hand, an owner of a particular pre-owned device may publish information associated with the pre-owned device, such as type, make, model, serial number, hardware configuration, usage history, condition, etc. To verify the information, the transaction platform may remotely access the device to extract values of certain device attributes or perform tests on certain hardware modules. The transaction platform may search its database to locate a price quote corresponding to the particular device provided by the recycler, and present the quote to the device owner. The device owner can then decide whether to accept the offer and complete the sale.

Transaction Platform for Pre-Owned Merchandise

In the current disclosure, for the convenience of description, potential buyers of pre-owned merchandise items, including recycling service providers needing to recycle the pre-owned merchandise, pre-owned merchandise dealers, and individual consumers needing to purchase pre-owned merchandise, are called the first users. On the other hand, users who provide pre-owned merchandise items for sale or transferred or who publish information associated with pre-owned merchandise items are called the second users. There are generally multiple first users and second users accessing the transaction platform; and for an item provided by a certain second user, there may be multiple first users offering to buy the item. This can prevent the situation that can possibly be unfair to the second user, i.e., when only a single buyer offers a price for the to-be-sold item.

In some embodiments, the first users may submit identification information (including, but not limited to: name, make, model, and the like) of various types of pre-owned merchandise items that they intend to obtain for recycling, including but not limited to: mobile phones, laptop computers, tablet computers, desktop computers, projectors, and computer accessories, such as motherboards, graphic cards, CPUs, hard disks, etc., to the server hosting the transaction platform. The server may store the corresponding relationships between the first users and the identification information of their desired merchandise items in a database. Note that, because of different personal preferences, different first users may offer different price for the same item. For example, considering a mobile phone, first users who focus on its photographing function may offer a relatively high price to the mobile phone as long as its camera pixel count is relatively high and the camera is functional; whereas other first users who focus on screen resolution may only offer a high price in the case of a higher screen resolution. In addition, some first users may be recyclers, whose technicians can perform simple repairs on accessories of certain devices to increase their values thereof. Hence, they may offer a high price for devices with defected accessories, such as mobile phones with malfunctioned cameras. However, an individual consumer lacking the ability to repair defective devices themselves may not consider such a defective device as of high value.

In some embodiments of the present invention, the first users may be allowed to upload corresponding price information of the merchandise items when they upload the identification information of the pre-owned merchandise items that they intend to obtain. Correspondingly, the server hosting the transaction platform mainly provides database support embodied in the identifiers and the price information of the pre-owned merchandise items uploaded by the first users. Some embodiments of the present invention provide a method and a system for establishing a pre-owned merchandise information database.

Figure 2:
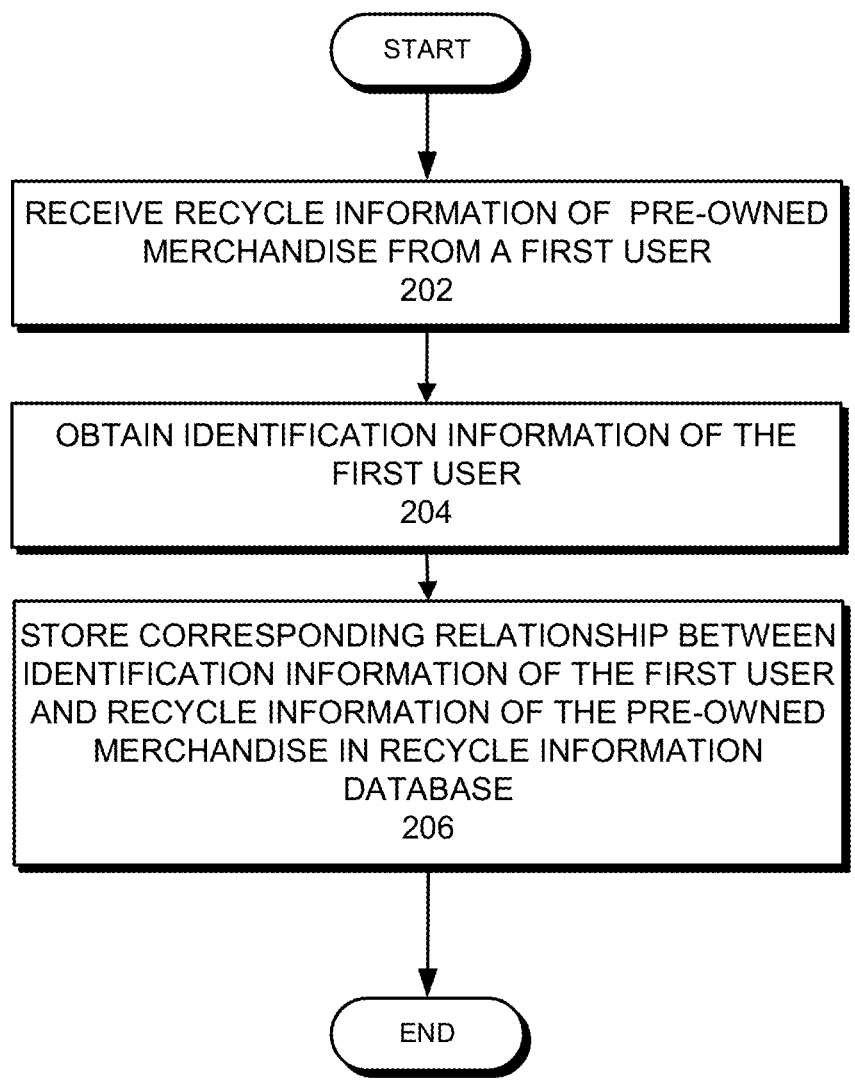
FIG. 2 presents a flowchart illustrating an exemplary server process for establishing a recycle information database, in accordance of an embodiment of the present invention.

FIG. 2 presents a flowchart illustrating an exemplary server process for establishing a recycle information database, in accordance of an embodiment of the present invention. During operation, the system receives from a first user recycle information of a pre-owned merchandise item that the first user intends to obtain for recycling purpose (operation 202). The recycle information includes the identification information and price information of the pre-owned merchandise item. The price information may indicate various offered prices corresponding to various values of each noticeable attribute. Note that the noticeable attributes can be device attributes that are worth noticing by the first users when they price the item. Also note that, for the same item, different first users may consider different attributes as noticeable. For example, certain first users may consider the color of the device as a noticeable attribute, whereas different first users may completely ignore the color.

The to-be-recycled pre-owned merchandise items may include multiple categories of items sold on the transaction platform, such as non-consumable daily necessities, furniture, household appliances, etc. One category is electronics, which can include, but are not limited to: personal computers (PCs), all-in-one computers, laptop computers, tablet computers, mobile phones, displays, printers, projectors, cameras, video recorders, etc. Furthermore, pre-owned merchandise for recycling may also include pre-owned vehicles, such as automobiles, motorcycles, electrical cars, bicycles, etc.

The recycle information of a to-be-recycled item may include two parts. The first part is the identification information of the item, which can be used to identify the item as of a certain type. The identification information may be assigned in a manner that it only specifies a high-level category name. For example, a first user may provide identification information of his desired pre-owned merchandise simply as "mobile phones." Consequently, all mobile phones belong to the recycling range of the first user, as long as they are proved to belong to the mobile phone category. The item identification information may also specify a brand or a model, or item IDs used in the transaction platform. Depending on the implementation, an input-control module (which can be in the form of an input field, a drop-down manual box and the like) may be provided to the first user in the user interface of his client computer to enable the first user to input item identification information. When needing to recycle a specific type of merchandise items, the first user may input, via the user interface, the identification information of his desired merchandise items. Typical recyclers often recycle items belonging to many different categories, and thus may input identification information of multiple categories.

The second part of the recycle information includes the attribute-specific price information, which can be used to calculate the price the first user is willing to offer to purchase the pre-owned item when the item has a specific attribute value. In some embodiments, a first user may be allowed to set offer prices of an item according to the selectable values of the item's various attributes. That is, the price of a pre-owned item offered by a first user may be determined based on the specific value of at least one attribute of the item. Setting the price based on attribute values can remove the influence of various subjective factors from the process of determining the price of pre-owned merchandise. In other words, the first user is not setting a purchasing price for a particular item for sale by a particular second user; instead, he is setting a purchasing price for a particular type of items with particular attribute values.

The noticeable attributes of a pre-owned merchandise item may include inherent attributes of the merchandise and attributes reflecting usage status. Specifically, different types of merchandise may have different noticeable attributes. For example, inherent attributes of mobile phones, tablet computers, and other mobile devices may include one or more of: brand, model, manufacture date, size, color, main screen resolution, standby time, storage capacity, processor model and frequency, channel of purchase, etc. Usage-status attributes may include one or more of: warranty condition, on-off switching condition, call function, key pad function, water-damage condition, maintenance history involving disassembly, condition of the camera or other accessories, charging ability, etc.

Noticeable attributes of laptop computers and all-in-one computers are similar to those of mobile devices, and may additionally include specification parameters of certain accessories (such as memory, hard disk, display, and the like), including the brand, specification, and frequency of the memory; the brand and capacity of the hard disk; the brand, size, and resolution of the display, etc.

Noticeable attributes of branded PCs may include one or more of: brand, model, manufacture date, etc. In addition, because PCs of the same brand and the same model may have different configurations, their noticeable attributes may include the specification parameters of various hardware modules, including one or more of: the brand, model, and the frequency of the processor; the brand and model of the motherboard; the brand, specification, and frequency of the memory; the brand and capacity of the hard disk; and the brand, size, and resolution of the display, etc. On the other hand, noticeable attributes of assembled PCs may only include the specification parameters of the various hardware modules. Similar to that of the mobile phones, the usage-status attributes of the PCs may include one or more of: warranty condition, on-off switching condition, call function, key pad function, water-damage condition, maintenance history involving disassembly, condition of the camera or other accessories, charging ability, etc. Noticeable attributes of various PC accessories, such as processors, motherboards, memories, hard disks, displays, mice, keyboards and the like, are similar to those of the PCs.

The inherent attributes of cameras, video cameras, and other image-capturing devices may include one or more of: brand, model, manufacture date, main screen size, lens configuration, channel of purchase, etc. Their usage-status attributes may include one or more of: shutter usage times, warranty condition, maintenance history involving disassembly, charging ability, etc.

Inherent attributes of household appliances may include one or more of: brand, model, manufacture date, capacity, power consumption level, etc. The usage-status attributes may similarly include one or more of: warranty condition, maintenance history involving disassembly, etc.

Inherent attributes of automobiles, motorcycles, and other motor vehicles may include one or more of: brand, model, manufacture date, fuel economy, engine condition, wheel drive, color, engine displacement, gearbox, interior, etc. The usage-status attributes may similarly include one or more of: mileage, accident history, warranty condition, maintenance history, annual inspection outcomes, etc.

Inherent attributes of bicycles or other non-motorized vehicles may include one or more of: brand, model, manufacture date, color, frame material, weight, variable speed transmission, braking system, folding ability, wheel size, etc. The usage-status attributes may similarly include one of or a combination of: warranty condition, maintenance history, etc.

Note that the attributes mentioned above are all illustrated by examples, and are not limited thereto in practical applications. Moreover, when selecting the noticeable attributes, the first user may also select a subset of the attributes according to his demand instead of paying attention to each attribute.

Moreover, the specific recyclable merchandise can vary in type, detailed descriptions of specific implementations will be given below using mobile phones as an example, and reference can be made for other types of merchandise.

Most attributes generally can have multiple selectable values. For example, the color of a mobile phone may include white, black, etc.; and the storage capacity may include 8 G, 16 G, etc. Merchandise of the same type with different attribute values may be priced differently. For example, for mobile phones of a certain model, a first user may offer a higher price for a white phone than a black phone (of course, this can be due to personal preference, and other first users may offer a higher price for the black phone). Similarly, a smart phone with 16 G storage capacity generally is offered a higher price than an 8 G phone. Note that, when the first users publish the recycle information associated with an item, they also need to provide information regarding how to price based on one or more specific attribute values. Therefore, in some embodiments, when the recycle information is received at the platform, in addition to information associated with which attributes of the merchandise is concerned by the first user, the prices offered by the first user corresponding to the values of attributes are received as well.

The attribute-specific price information may be embodied in two specific forms. The first form is a judging condition, which can be used to indicate whether an item having specific attribute values provided by a second user meets the recycling criteria of the first user. For example, when recycling mobile phones of a certain model, a first user may only wants to recycle white ones with a storage capacity of 32 G. In this case, when submitting the recycling information to the transaction platform, the first user may set the attribute-specific price information corresponding to the attribute value "white" under the color attribute and the attribute value "32 G" under the storage capacity attribute as judging conditions, and set the judging conditions in such a way that if the color is white and its storage capacity is 32 G, the pre-owned mobile phone may be recycled, otherwise, it may not be recycled.

The other form of the attribute-specific price information is a price-calculation factor, which can be used to calculate the price offered by the first user for items having certain attribute values. For example, noticeable attributes of certain merchandise may include the channel of purchase and the warranty condition. The channel of purchase can possibly have four different values, listed as: smuggled goods without lock (the mobile device may be a device from other countries and is not licensed in mainland China or Hong Kong), licensed goods from mainland China (the mobile device has a valid network-access license from mainland China), smuggled goods with lock (the mobile device is not licensed in mainland China or Hong Kong and is bound to a certain foreign network), and licensed goods from Hong Kong (the mobile device is purchased from Hong Kong under a global service agreement); the warranty condition can possibly have four different values, listed as: remaining warranty period beyond 6 months, remaining warranty period between 3 and 6 months, remaining warranty period between 1 and 3 months, and exceeding the warranty period.

In general, regardless of the specific attribute values of the pre-owned items, the first user may be willing to recycle the pre-owned items, but will offer them different prices based on different attribute values. To do so, the first user may assign a specific price-calculation factor for each value of these attributes. For example, for the above-mentioned four values of the "channel of purchase" attribute, a first user may assign price-calculation factors as 500 Yuan, 700 Yuan, 600 Yuan and 600 Yuan, respectively. Similarly, the price-calculation factors corresponding to the above-mentioned four values of the warranty condition attribute can be 800 Yuan, 700 Yuan, 600 Yuan, and 400 Yuan, respectively. Therefore, if the values of the two attributes of a particular pre-owned item are "licensed goods from mainland China" and "remaining warranty period beyond 6 months," it may be determined that the price offered by the first user to purchase this particular item is 700+800=1500 Yuan.

Note that, during implementation, the above-mentioned two forms of attribute-specific price information may coexist, that is, when setting the attribute-specific price information according to the attribute values of the to-be-recycled merchandise, a first user may set the attribute-specific price information of certain attributes as judging conditions and set the attribute-specific price information of the other attributes as the price-calculation factors. For example, a mobile device may have four noticeable attributes: color, storage capacity, channel of purchase, and warranty condition. A first user may limit values of the color and storage capacity attributes, but do not limit the values of the other two attributes. Consequently, different attribute-specific price information should be provided for different attributes. The attribute-specific price information for the color and storage attributes will include judging conditions, whereas the attribute-specific price information for the other two attributes will include price-calculation factors.

The server hosting the platform may determine whether the attribute-specific price information inputted by the first user for a specific attribute value is a judging condition or a price-calculation factor based on the input data type. Normally, the data type corresponding to a judging condition is Boolean, because the judging condition only has two values, "Yes" and "No." For example, if a first user intends to recycle certain merchandise only if it is white, then when publishing the recycle information associated with the merchandise, the first user will input the attribute-specific price information as "Yes" corresponding to the color attribute of the merchandise being white. Accordingly, the server can determine that such attribute-specific price information is a judging condition. On the other hand, the data type corresponding to a price-calculation factor is generally a numeric type. For example, a first user may set the price-calculation factor corresponding to the storage-capacity attribute value of "8 G" as "500 Yuan," and set the price-calculation factor corresponding to the storage-capacity attribute value of "16 G" as "700 Yuan." Accordingly, the server can determine that the attribute-specific price information is a price-calculation factor based on the input including numeric values. Subsequently, when determining the offer price of a merchandise item based on received attribute-specific price information, the server can perform different processing for different attributes. For example, the server may first determine, based on one or more judging conditions, whether a certain item is meeting the recycling criteria of the first user, and if so (the values of all judging conditions are "Yes"), the server may then calculate, using one or more price-calculation factors, the offer price for the item. Otherwise, if it is determined, based on the one or more judging conditions, that the item does not meet the recycling criteria of the first user, the server will not need to calculate the offer price using the one or more price-calculation factors.

During implementation, the first users may input to the platform, the noticeable attributes and the attribute-specific price information corresponding to each attribute value themselves. However, different first users may adopt different input formats, which can be an obstacle for the server to store the different inputs from the different first users and to subsequently calculate the offer prices. To ensure that different first users all use a standardized input format, thus facilitating simplified data storage and management, in some embodiments, the transaction platform provides a standardized user interface at the client machine of the first users. The user interface may include one or more option groups, with each option group corresponding to a noticeable attribute. Each option group includes one or more attribute value options and an input control for inputting attribute-specific price information corresponding to the attribute value. This way, a first user can select noticeable attributes and input attribute-specific price information corresponding to different values of each noticeable attribute via the user interface, which then uploads the attribute selection and the attribute-specific price information from the client machine to the server. The server can then determine, based on the uploaded information, the noticeable attributes selected by the first user and the attribute-specific price information corresponding to the various values of the selected attributes.

As discussed previously, merchandise belonging to different categories may have different noticeable attributes. For example, noticeable attributes of furniture may include color, material, height, width, or the like; whereas noticeable attributes of mobile phones or other mobile devices may include color, storage capacity, channel of purchase, warranty condition, etc. Hence, when the user interface receives recycle information, the identification information of the to-be-recycled pre-owned item should be received first in order for the system to determine the category to which the item belongs. The system can then determine which attributes corresponding to the category based on the preset corresponding relationship between the category and the attributes, and then arrange corresponding option groups in the user interface, with each option group including a set of selectable attribute values.

Now turn to the attribute-specific price information, which can include price-calculation factors and judging conditions. In some embodiments, the system may determine the price of an item with multiple attributes by cumulatively adding the corresponding price-calculation factors. For example, a certain item may have two noticeable attributes A and B with attribute values of a and b, respectively. A first user may set a price-calculation factor for attribute value a as 500 Yuan, and set a price-calculation factor for attribute value b as 600 Yuan. Accordingly, the system can calculate that the first user is offering 500+600=1100 Yuan for the item. However, in practice, when recycling a pre-owned item, the first user usually estimates an overall offer price for the item and then makes adjustments based on the actual values of its attributes. For example, a first user may estimate the price of a per-owned smartphone of a certain brand as 1500 Yuan, and then add or subtract certain amount from the offer price based on the actual attribute values, such as the storage capacity being 8 G or 16 G. On the other hand, if the overall price is determined by cumulatively adding all price-calculation factors, the first user would need to distribute, beforehand, the estimated total price into various specific attributes, and also needs to embody the difference of different attribute values, which is not an easy task, especially when there are many noticeable attributes associated with an item.

To simply the pricing process, in some embodiments, the first users are allowed to provide a baseline price, and set the price-calculation factors corresponding to the various attribute values as positive or negative adjustments to the baseline price. For example, a first user may set the baseline price for a smartphone as 1000 Yuan, and set the price-calculation factors corresponding to the color attribute being "white" and "black" as positive 100 Yuan and negative 50 Yuan, respectively. As a result, the overall price for a white phone is the baseline price plus 100 Yuan, and the overall price for the black phone is the baseline price minus 50 Yuan.

To implement such a pricing strategy, in some embodiments, the user interface includes an input control for inputting the baseline price and one or more option groups, with each option group including one or more attribute values and corresponding input controls for inputting the attribute-specific price information, such as price-calculation factors. Accordingly, the system may first receive a baseline price corresponding to the identification information from a first user through the baseline price input control embedded in the user interface. The system can then receive, from the first user via appropriate input controls, the price-calculation factors (which indicate both the price-adjusting direction and the amplitude) corresponding the various values of the attributes. If there are multiple noticeable attributes needed, the system generates a price-adjusting formula based on the attribute value options and the corresponding price-adjusting direction and amplitude, and then uploads the baseline price and the price-adjusting formula as the price information for the item corresponding to the merchandise identification information to the server.

Figure 3A:
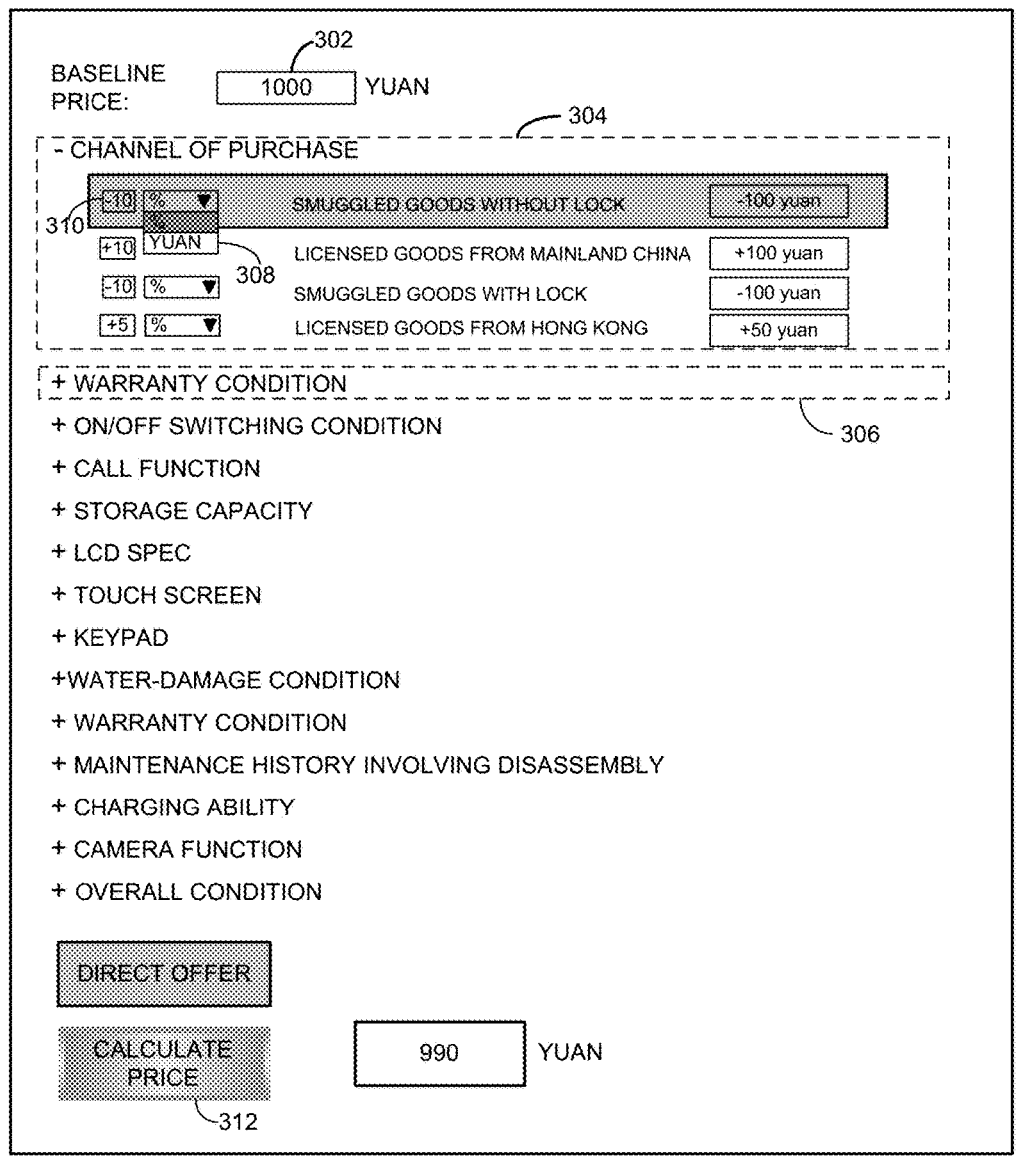
FIG. 3A presents a diagram illustrating an exemplary user interface presented on a client machine of a first user, in accordance with an embodiment of the present invention.

FIG. 3A presents a diagram illustrating an exemplary user interface presented on a client machine of a first user, in accordance with an embodiment of the present invention. In FIG. 3A, user interface 300 includes an input field 302 for inputting the baseline price and multiple option groups, such as option groups 304 and 306. The option groups correspond to noticeable merchandise attributes, which can include, but are not limited to: channel of purchase, warranty condition, on-off switching condition, call function, storage capacity, liquid crystal display (LCD) specifications, touchscreen, keypad, water-damage condition, warranty condition, maintenance history involving disassembly, charging ability, camera function, overall condition, etc. Each option group includes a set of selectable attribute values. In some embodiments, specific attribute values of a certain merchandise item are provided by the owner of the merchandise item. However, the device owner either may not know or may not report all attributes honestly. To ensure that the system receives true attribute values, in some embodiments, the system automatically detects the actual attribute values of the merchandise item, especially if the merchandise item is a terminal device (such as a PC, a laptop computer, a tablet computer, a smartphone and the like) equipped with an operating system, or accessories thereof (such as a hard disk, a motherboard, a processor or the like of the PC or laptop computer), or other types of terminal device (such as a display, a keyboard, a computer mouse, a printer, a projector and the like) that can be connected, via wired or wireless networks, to a terminal device equipped with an operating system. In addition, with the wide implementations of the Internet of Things, the system can also automatically detect attribute values of smart appliances that can be connected to computers. The attributes that can be automatically detected include but are not limited to: CPU models, CPU performance, manufacture dates, memory utilization rates, etc. Other attributes, such as water-damage condition, warranty condition, etc., typically cannot be detected automatically and would need to the provided by the device owner. In FIG. 3A, user interface 300 includes a "+/−" button in front of each option group. Toggling the "+/−" button can result in the unfolding/folding of the corresponding option group. Note that the various attribute values will be displayed if an option group is unfolded. In the example shown in FIG. 3A, unfolded option group 302 represents the "channel of purchase" attribute, and includes four values: "smuggled goods without lock," "licensed goods from mainland China," "smuggled goods with lock," and "licensed goods from Hong Kong." In FIG. 3A, user interface 300 also includes an input control for each attribute value option to allow the first user to input the attribute-specific price information, which can be a judging condition of a price-calculation factor. Note that a price-calculation factor can include a price-adjusting direction and a price-adjusting amplitude, which are used as parameters in the price-adjusting formula to influence the final price offered to a certain merchandise item by the first user.

Note that the price-adjusting amplitude can be expressed either as a percentage or as an absolute value, which can be chosen through a drop-down menu, such as a drop-down menu 308. If the percentage is chosen, the number inputted in the input field indicates that the price-adjusting amount is a certain percentage of the baseline price. For example, in FIG. 3A, the selected entry in drop-down menu 308 is percentage, meaning that the number within adjacent number field 310 reflects a percentage of the baseline price. More specifically, the number "−10" in number field 310 indicates that, if the channel of purchase of the merchandise item is "smuggled goods without lock," the system will deduct 10% of the baseline price from the final price. In this example, the baseline price is 1000 Yuan, and hence the amount of price deduction for an item whose channel of purchase is listed as "smuggled goods without lock" will be 1000 Yuan×10%=100 Yuan. The calculated price adjustment (−100 Yuan) is also displayed at the right side of the entry corresponding to this attribute value.

Figure 3B:
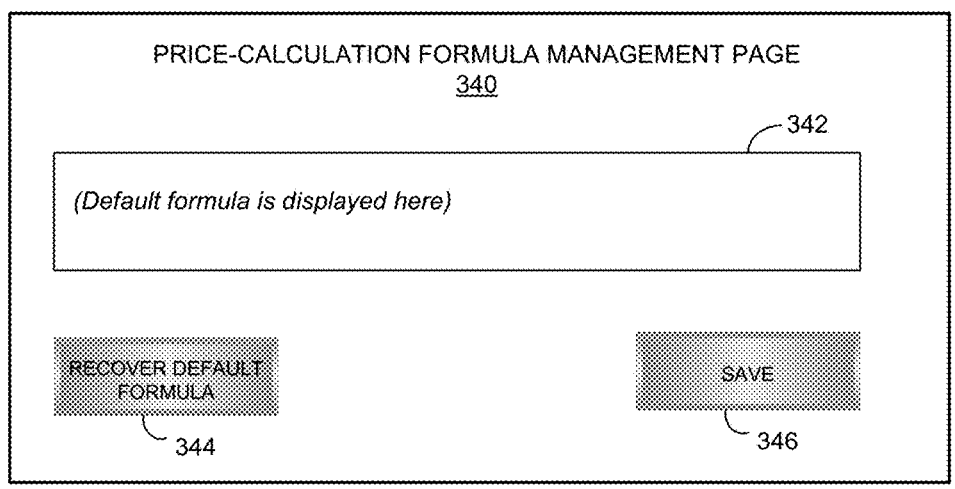
FIG. 3B presents a diagram illustrating an exemplary user interface for price-calculation formula management, in accordance with an embodiment of the present invention.

User interface 300 may also include a price-simulation button 312, and a first user can click on price-simulation button 312 to view the price-calculation formula after price-adjusting factors for all attribute values are received. A first user may hypothetically select certain attribute values for a hypothetical item (such as a mobile phone of a certain color and has a certain storage capacity) to view a simulated final price. In some embodiments, the system may display to the first user a price-calculation formula management page to allow the first user to view the price-calculation formula. FIG. 3B presents a diagram illustrating an exemplary price-calculation formula management page, in accordance with an embodiment of the present invention. In FIG. 3B, price-calculation formula management page 340 includes a field 342 that displays the price-calculation formula, which is updated when the price-adjusting factors for all attribute values are received at the client user interface. Note that, in most cases, a default formula is used to calculate the price. As discussed previously, the default formula may include cumulative additive relationship among all price-calculation factors, or it may include adjustments made to the baseline price. Price-calculation formula management page 340 includes a default-formula recovery button 344, which can be clicked to recover the default formula in cases of operation mistakes of the first user. Price-calculation formula management page 340 also includes a save button 346. Once the first user finishes inputting all attribute-specific price information, he can click save button 346 to upload the baseline price along with the price-calculation formula to the server. Note that, in embodiments of the present invention, a first user may set the baseline price and attribute-specific price information based on his preference. In this way, for the same merchandise item, different first users may provide different personalized prices.

Depending on the implementation, the price-calculation formula may take various forms. In some embodiments, the price-adjustment formula is expressed as: $\Sigma_n^1 P_n$, with n being an integer, indicating the total number of noticeable attributes (option groups in FIG. 3A), and $P_n$ being the score of option group n. Note that the score can be either positive or negative.

In the example shown in FIG. 3A, within the option group "channel of purchase", the attribute value of an item is "smuggled goods without lock", and the corresponding price-adjusting factor is "−100 Yuan," meaning that the score of this option group is "−100." This example shows that the score of the option group under a particular attribute value is the same as the price-adjustment factor; in practice, the score can also have different relationships with the price-adjustment factor. Moreover, in addition to adding scores of different option groups together, the price-calculation formula may have other forms, such as multiplying all scores together.

In some embodiments, the price offered by a first user to certain merchandise item can be calculated as $P_d = P_0 + \Sigma_n^1 P_n$, with $P_d$ being the offered price and $P_0$ being the baseline price.

It should be noted that, in practice, different first users may submit identical or similar attribute-specific price information for the same item because certain attributes may be universally desirable. Accordingly, the system may also provide reference price to the first users. For example, after inputting the identification information of a to-be-recycled item, a first user may inquire, via the user interface, from the recycle information database for prices offered by other first users for items corresponding to the item identification information. Consequently, the user interface may display recommended price information to the current first user. The recommended price information may include the baseline price and the price-calculation formula. After viewing the recommended price information, a first user may determine that the recommended price meets his requirements, and decide to directly apply the recommended price without re-configuration. In the meantime, the system can provide a way for the first user to modify the recommended price information, such as modifying the baseline price, the price-calculation formula, or the attribute-specific values. The final price offered to the item by the first user will be determined based on modifications to the recommended price information.

The aforementioned price-calculation formula embodies the influence of the attribute values of the pre-owned item on the determined recycle price. In practice, some first users may consider other factors prior to determining whether to recycle a pre-owned item. Such factors may include credit reputation, favorable ratings, and the like of the second user. In some embodiments, the user interface provided to the first users may include an operation control for setting recycling conditions. The first users may set, via the user interface, the recycling conditions, and the server may add and store the recycle condition information associated with specific first users in the database. In this way, when the system determines offer prices for certain merchandise, the system may filter first users capable of recycling the merchandise based on their corresponding recycling conditions, and only provide offers from certain first users whose recycling conditions are met by the merchandise.

Now return to FIG. 2. Subsequent to receive recycle information from the first user, the system obtains identification information of the first user (operation 204). Note that identification information of the first user may include a user name used by the first user on the transaction platform, or a user ID and the like provided by the transaction platform to the first user. In many cases, the first user submits the recycle information after logging in to the transaction platform, and hence, when submitting the recycle information, the client machine used by the first user may carry the identification information of the first user in a request. Consequently, the server may directly extract the identification information of the first user from such a request.

In addition, the server of the transaction platform generally stores other information of the first users, such as the reputation, favorable ratings, and the like, which can be determined based on the identification information of the first user. During a real transaction, the server can send this information to the second user's client machine, so that the second user is provided with more information of the first user.

The system then stores, in the recycle information database, the corresponding relationship between the identification information of the first user and the recycle information of the pre-owned merchandise (operation 206). Note that information stored in the recycle information database can later be used to determine the offer price of the first user for a pre-owned item provided for recycling by a second user.

After receiving the recycle information, which includes item identification information and price information, of the pre-owned item, one or more records are added in the recycle information database, with each record storing the corresponding relationship between the identification information of the first user and the recycle information (including the item identification information and the price information) of a to-be-recycled pre-owned item. It should be noted that, if a first user only intends to recycle a single item, one record will be generated in the database for the first user. On the other hand, if the first user intends to recycle multiple items, multiple records will be generated in the database for the first user, with each record corresponding to one item.

FIG. 4A presents a diagram illustrating exemplary entries in the recycle information database, in accordance with an embodiment of the present invention. From FIG. 4A, one can see that the baseline prices and the price-calculation formulas given by different first users for the same item can be different. In addition, the baseline prices and price-calculation formulas given by the same first user for different items can also be different. FIG. 4A also shows that a first user may recycle multiple items, with each item corresponding to a database entry. In practice, it is also possible that a first user offers a same baseline price for different items, which is usually the case when the first user is recycling merchandise of the same type. For example, a certain first user may offer 1000 Yuan as a baseline price for all smartphone. In this case, in order to facilitate the first user submitting the price information for all smartphones, the system may provide an operation control in the user interface that allows the first user to submit the baseline price in batches. When the system receives the baseline price via the batch control, the system may uniformly apply the baseline price to all items recycled by the first user.

FIG. 4B presents a diagram illustrating exemplary entries in the recycle information database, in accordance with an embodiment of the present invention. In FIG. 4B, the first users also submit the recycling conditions associated with the items. From FIG. 4B, one can see that different users may apply different recycling conditions to the same item, and a same user may apply multiple recycling conditions to a same item.

Once the server generates the recycle information database, the server can respond to subsequent inquiries from second users regarding prices of the to-be-recycled pre-owned items. In some embodiments, the system can provide price information offered by multiple first users to allow price comparison by the second users. Moreover, because a second user may see the price offered by the multiple first users simultaneously, when providing the price information, the first users are motivated to provide, as far as possible, objective and impartial pricing, thus reducing the chances of unfair pricing. Because the price information of the to-be-recycled item stored in the database is used to determine the final sale price of the item, the price information should be linked to the market trend of the similar items, pre-owned or new, so that more reasonable price can be provided and the deal-making success rate can be improved.

In some embodiments, the price information of items stored in the database may change dynamically. In a further embodiment, when submitting the recycle information associated with an item, the first user may submit a price-update condition and corresponding update rules. The price-update condition is generally associated with time or price changes. For example, the baseline price of certain pre-owned merchandise may be updated according to the market price of the corresponding new merchandise items or according to the actual sale price of similar pre-owned merchandise items on the transaction platform. To update the baseline price according to the market price of new merchandise, the system can inquire the price of the new merchandise from certain transaction platforms of such merchandise. Moreover, the system can monitor the time or the price-update condition, and if the price-update condition is satisfied, the system updates the price information stored in the recycle information database based on the update rules. For example, the system may perform price update every 10 days, or each time the market price of the new merchandise fluctuates by 10%, etc. Note that, when the price information is updated, the system may update both the baseline price and the price-calculation formula, or the system may only update one of them, such as only updating the baseline price.

If the first user did not set specific price-update conditions when submitting the recycle information, the server may set a default price-update condition, which can be associated with the time or the trading price of similar pre-owned merchandise on the transaction platform. In this way, the server can monitor the time or price of the merchandise in the transaction platform to determine whether the price-update condition is satisfied. If so, the server provides a prompt message to prompt the first user to update the price information stored in the recycle information database.

Figure 5:
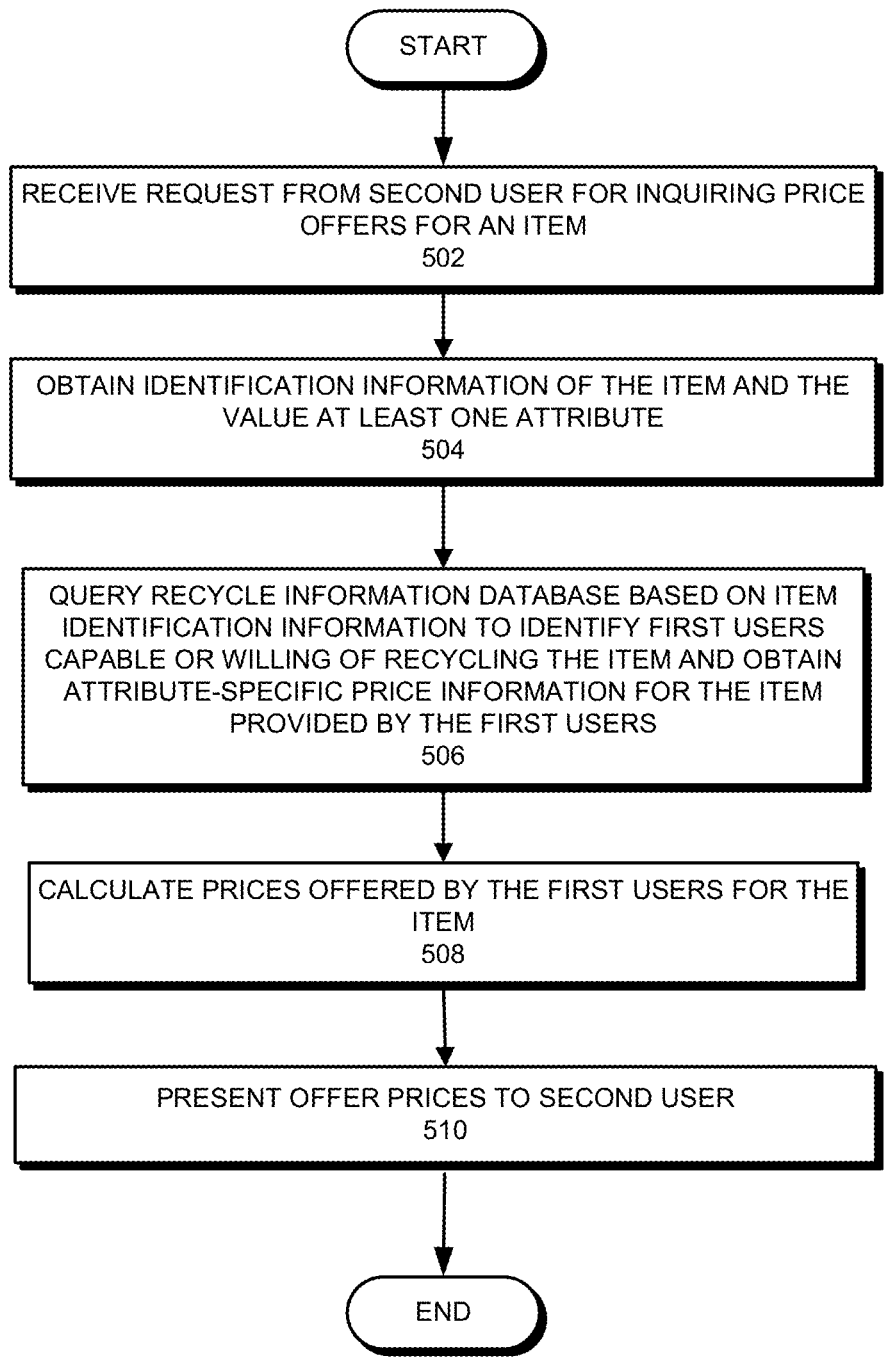
FIG. 5 presents a flowchart illustrating an exemplary server process of determining the price of a particular to-be-recycled item, in accordance with an embodiment of the present invention.

FIG. 5 presents a flowchart illustrating an exemplary server process of determining the price of a particular to-be-recycled item, in accordance with an embodiment of the present invention. During operation, the system receives a request, from a second user via his client machine, inquiring price offers for a to-be-recycled item (operation 502). For example, a second user wish to recycle his used smartphone may log in to the transaction platform, and inquire an offer price from buyers for his used smartphone. The second user can send a request inquiring price offers for his pre-owned item in various ways, which will be described below by examples.

In some embodiments, after logging in to the transaction platform, which can be accessed via a website, the user may manually input information of his pre-owned item in appropriate pages, such as a personal setting page and the like. For example, he can fill in the model of the item in the personal setting page. In further embodiments, the personal setting page may provide multiple entry points, such as links, for publishing recycle information. For example, the personal setting page may include an "item to sell" button, and clicking the button sends the user's request for publishing recycle information to the server of the transaction platform. In further embodiments, clicking such a button can lead the user to a second webpage where the user can publish recycle information for his to-be-recycled item. This implementation enables the user to conveniently access the transaction platform website through various devices capable of accessing the Internet and send the request for publishing recycle information.

In some embodiments, the to-be-recycled item is a terminal device loaded with an operating system or accessories thereof, or other terminal devices connectable to the terminal device loaded with the operating system, the system may receive request for publishing recycle information directly from an application client installed and operated on this terminal device. In addition, the second user may directly send a request inquiring price offers for the item via the application client, which may be installed on the item itself or on a terminal device connected to the item. In the meantime, the application client can also integrate additional functions, such as a device verification function, an offer-price lookup function, and a communication function, which enables directly communication to the first user; thereby facilitating the second user to publish recycle information and inquire the offer prices.

Subsequent to receiving the request for publishing the recycle information, the system obtains identification information and the value of at least one attribute of the to-be-recycled item (operation 504).

As described previously, the identification information of the item can include, but are not limited to: name, make, model, serial number, and the like. In some embodiments, the system extracts the item identification information from the request for publishing recycle information. In addition, because the price offered by the first users for the item is determined based on specific attribute information (which is used as parameters in the price-calculation formula) of the item, the system needs to obtain the specific values of the attributes. Accordingly, the server can use these specific values and attribute-specific price information provided by targeted first users to calculate the offer price of the targeted first users for the item.

Note that the attribute values of a particular item can include values of various inherent attributes and values of various usage-status attributes. These attribute values can be acquired in various ways. In some embodiments, the system provides a user interface at the client device of the second user. Similar to the user interface provided to the first users, the user interface for the second user may include one or more option groups, with each option group corresponding to an attribute. In addition, each option group can include one or more attribute value options, thus allowing the second user to select attributes and specifying values of the selected attributes. The selected attributes and their values are then uploaded from the client device to the server of the transaction platform.

Figure 6:
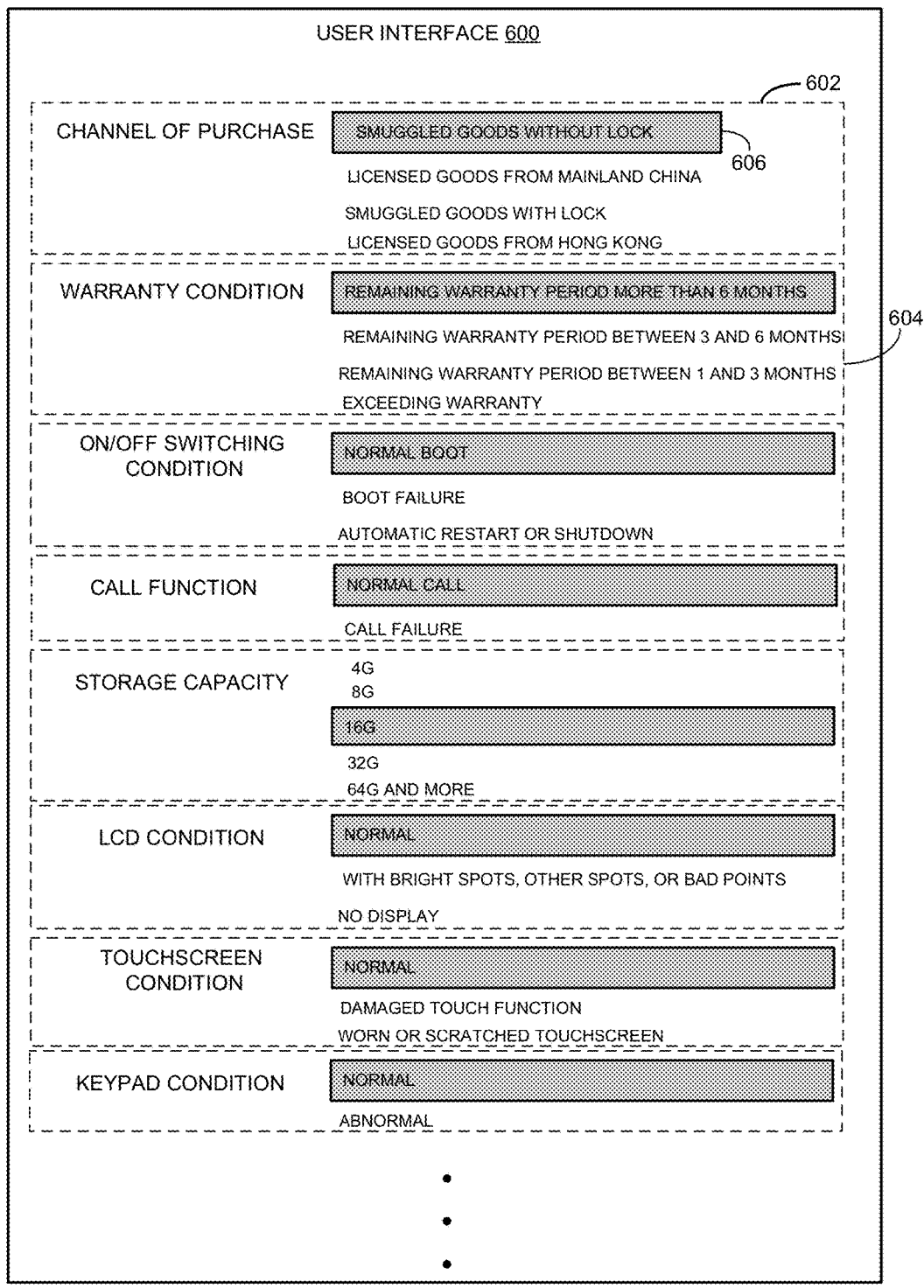
FIG. 6 presents a diagram illustrating an exemplary user interface presented on a client machine of a second user, in accordance with an embodiment of the present invention.
Figure 6:
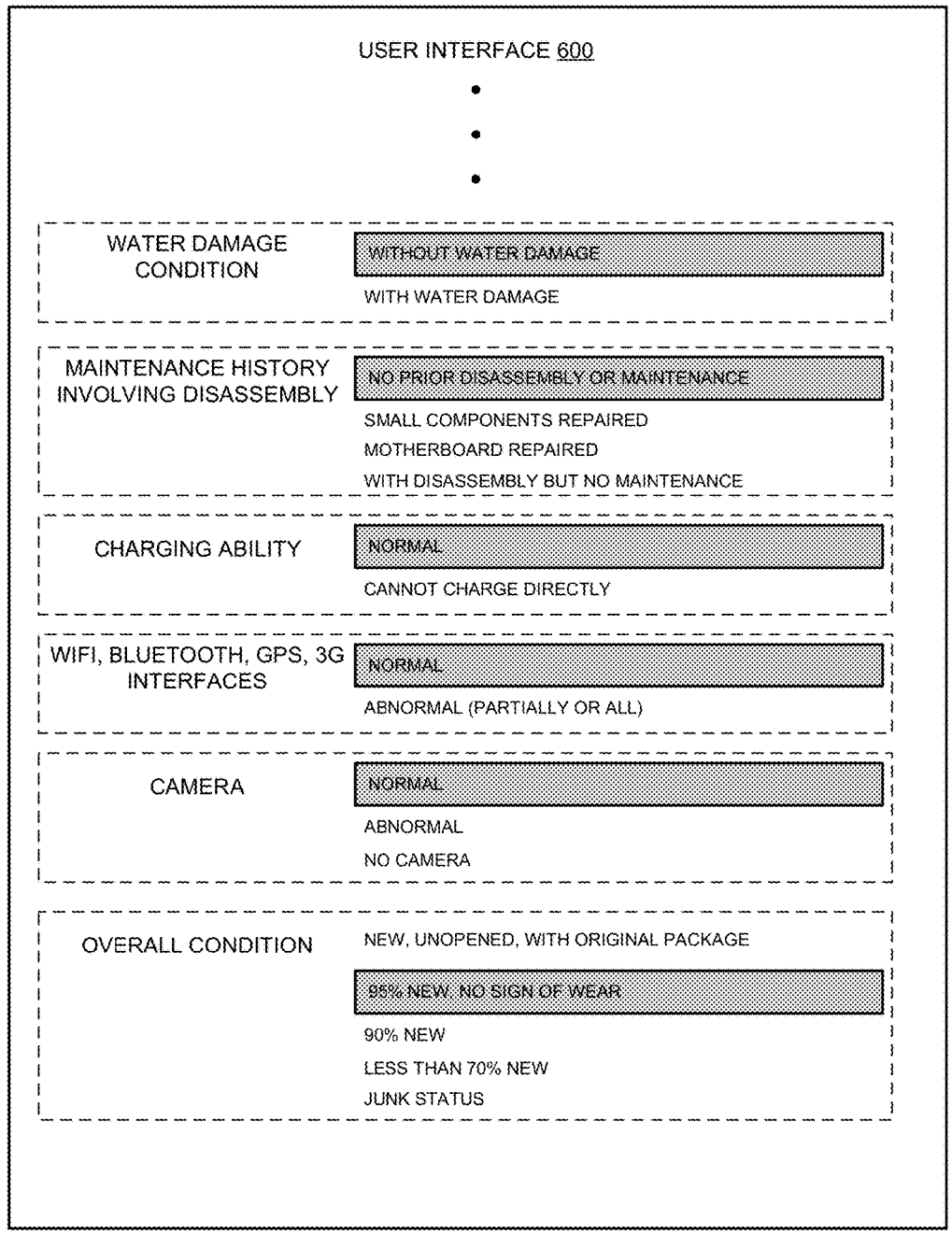

FIG. 6 presents a diagram illustrating an exemplary user interface presented on a client machine of a second user, in accordance with an embodiment of the present invention. In FIG. 6, user interface 600 includes a number of option groups, such as option groups 602 and 604. The option groups represent various attributes, such as the channel of purchase, the warranty condition, the on-off switching condition, the call function, the storage capacity, the LCD condition, the touchscreen, the keypad function, the water damage condition, the maintenance history involving disassembly, the charging ability, WiFi®/Bluetooth®/GPS/3G interfaces, the camera, the overall condition, etc. Each option group includes multiple selectable options, and the second user may select options that correspond to the attribute values of the item. In the example shown in FIG. 6, the selected options are highlighted, such as selected option 606. Of course, the foregoing examples are merely exemplary, in practice, the option groups and the device attribute value options provided in user interface 600 are not limited to the listed ones.

In practice, the option groups presented in user interface 600 can be different according to different categories of the to-be-recycled items. During operation, the system may first identify noticeable attributes associated with the item, and then determine specific option groups to be presented in the user interface according to these attributes. Specifically, the system may first identify one or more targeted first users capable of recycling the item based on the item identification information. Subsequently, the system combines all noticeable attributes from the targeted first users to form a merchandise attribute set, and determines which option groups need to be provided in the user interface to the second user. For example, target first users capable of recycling a merchandise item can include a user A and a user B, with noticeable attributes specified by the user A including an attributes a and b, and with noticeable attributes specified by the user B including an attributes b and c. Accordingly, the system forms a merchandise attribute set {a, b, c}, and presents option groups corresponding to these three attributes in the user interface, thereby enabling the second user to provide specific attribute values of the item for these three attributes. Other attributes that are not concerned by the targeted first users are not presented in the user interface, thus reducing waste of resources caused by acquiring useless attributes.

In addition, if the merchandise item is a terminal device loaded with an operating system, accessories thereof, or other terminal devices connected to the terminal device loaded with the operating system, certain attribute values, such as CPU model and frequency, may not be easily available to the second user via visual inspection. On the other hand, allowing the second user to manually provide such attribute values faces the risk of false reporting. To obtain accurate attribute values of such a merchandise item, in some embodiments, the system may automatically obtain the attribute values by running certain applications (such hardware testing or detection application software) on the terminal device. Note that, for items that are loaded with operating systems, such as mobile phones, tablet computers, PCs and the like, specific system tools may operate directly on these devices to automatically report the attribute values thereof, for example, CPU models, performance, manufacture dates, etc. For items that can be connected to a computer, such as displays, keyboards, mice, printers, projectors, and smart appliances, the system may obtain attribute values using hardware testing or detection application running on the connected computer.

Note that different types of merchandise items may require different testing or detection applications to be installed. Accordingly, the client machine providing the user interface may store the corresponding relationship between the item identification information and the identification information of the application software. During operation, the client machine may determine which application software is needed based on the item identification information, and then activate the corresponding application software to acquire the attribute values. In preferred embodiments, the above-mentioned corresponding relationship may also be stored in the server of the transaction platform. In this case, the server may determine which application software is needed for detecting the attribute values of a particular item based on the item identification information, and then send such information to the client machine of the second user. The client machine can obtain accurate attribute values by downloading, installing, and running the application software, and then upload the attribute values to the server.

In addition, many manufactures attach, often in the form of a label, optical machine-readable identifiers (such as one or two-dimension barcodes) on their manufactured items, and these optical identifiers may carry some inherent attribute information of the items, including but not limited to: names, models, manufacture dates, etc. In such a case, one may simply obtain such attribute information by scanning the optical identifier.

Of course, the noticeable attributes of the first users can include attributes that cannot be obtained by running the testing or detection applications or by scanning an optical identifier. More particularly, values of usage-status attributes, such as the water-damage condition, maintenance condition, etc., often cannot be obtained automatically. In some embodiments, if noticeable attributes specified by the first users include attributes whose values cannot be obtained automatically, the server provides a user interface at the client device of the second user to allow the second user to report those attribute values. The user interface includes at least one option groups, and each option group corresponds to one of the noticeable attributes whose values cannot be obtained automatically. Moreover, each option group includes one or more selectable attribute value options, thus allowing the second user to select, via the user interface, appropriate values of the attributes. These attribute options may include comprehensive information associated with the item, such as the channel of purchase, usage time, device configurations, status of failure, overall appearance, etc. The values of these attributes are useful in making a more accurate determination of the overall state of the item, thus laying a good foundation for providing a reasonable price offer for the item.

Furthermore, the multiple option groups provided in the user interface may be associated with each other in a way such that a selection of an option in an option group can result in deselecting or deactivating of options in the other option groups. For example, an illegally purchased pre-owned item in general does not receive warranty services; therefore, the option group corresponding to the "warranty condition" is no longer needed. In a different example, if "boot failure" is selected in the "on-off switching condition" option group, it indicates that the device could not turn on to perform the call function. As a result, the "call failure" option should be selected in the option group "call function." To simply the process of inputting attribute values, in some embodiments, the system may determine, based on a current value option of an attribute option group, whether there is an associated option group. If so, the system may control, in the user interface, the associated option group in ways such as disabling the associated option group entirely, disabling one or more options within the option group, or selecting an option in the option group. Using the aforementioned device with the boot failure as an example, the system may directly select the "call failure" option in the "call function" option group while disabling all other options within the same option group. In some embodiments, such control of the options groups can be achieved by embedding a computer script in the webpage or application of the user interface. In further embodiments, the computer script includes a Groovy script.

Now return to FIG. 5. Subsequent to obtaining the item identification information and attribute values, the system queries the recycle information database based on the item identification information to identify one or more targeted first users capable or willing of recycling the item, and obtains corresponding attribute-specific price information provided by the identified first users (operation 506). Note that, in rare occasions, the database query returns an empty set, meaning that the system did not find a first user who is capable if recycling the item. For example, the recycle information database does not have an entry that corresponds to the item identification information. In some embodiments, in such cases, the item identification information and the identity of the second user can be stored in the database, and the system may notify the second user if a first user submit recycle information associated with the item.

Subsequently, the system uses specific attribute values of the item and the attribute-specific price information of the first users to calculate the offer prices (operation 508). Note that calculating the offer price may involve obtaining the baseline price and the attribute-calculation formula, and applying the specific attribute values to the attribute-calculation formula.

The system then presents the offer prices of the first users for the item to the second user (operation 510). In some embodiments, the system sends the price offers to the client machine of the second user, which may display, on the user interface, the first users and their offer prices to allow the second user to make a decision in terms of whether to publish the recycle information or select a buyer from the identified first users.

In some embodiments, the user interface of the second user may include a "sell" button adjacent to the entry corresponding to each first user, and the second user can select a first user to sell his item by clicking the button. In some embodiments, entries corresponding to the first users may include various types of information, including but not limited to, name, contact, online/offline status, reputation, trading volumes, etc., thereby assisting the second user in the comprehensive evaluation of the first users.

In some embodiments, when presenting the first users and their offer prices, the system may sort the list of the first users and display the first users in order, thus facilitating the second user in determining the sale price or selecting an appropriate buyer. For example, the system may rank the identified first users based on their transaction history, such as past user evaluations or trading volumes. The system may also apply a comprehensive scoring algorithm to obtain comprehensive scores of the first users. In some embodiments, the user interface may allow the second user to input their preference in ways of ranking the first users, and the system ranks the displays the ranking results accordingly.

In some embodiments, the system may additional authenticate the item upon receiving a request from the second user to publish the recycle information of the item. In other words, if a second user decides to sell his item via the transaction platform (by publishing the recycle information), the system needs to verify whether the item he intends to cell is an authentic product of a counterfeit. This process is often performed if the item is an electronic device. To do so, the system may first obtain configuration information of various hardware components within the item, and then compare such configuration information with the standard hardware configuration defined by the manufacturer. If a mismatch is detected, the item may be a counterfeit product. Sometimes the configuration information of the various hardware components can be faked, thus requiring the system to verify the authenticity of the item by measuring its performance. In some embodiments, upon receiving the request to publish the recycle information, the system may remotely test, via certain testing applications, the performance of particular modules in the item. In some embodiments, the system may ran a test program to test the performance of certain modules, such as a CPU, a graphic processing unit, a WiFi® interface, a memory, an antenna and the like. To do so, the system may access those hardware modules to directly test their performances. By testing the integer calculation capability, the multimedia processing capability, and the 3D processing capacity of the CPU, the system determines whether the performance of the CPU is consistent with the CPU performance of an authentic device. Because most counterfeit products include hardware modules of a lesser quality or lower performance. By detecting the performance of individual modules, the system can make an accurate determination on whether the item is authentic, thus ensuring the transaction reliability.

The system continues to subsequent transaction operations if the item has been authenticated; otherwise, the transaction process is terminated, thus reducing or eliminating circulations of counterfeit goods on the transaction platform, and increasing the confidence of buyers and sellers.

Embodiments of the present invention allow first users to determine offer prices for an item according to the specific attribute values of the item, thus making the pricing of items a relatively objective process. In addition, the price information of a plurality of first users may be presented to the second user at the same time, thus reducing the likelihood of a certain first user maliciously lowering the offer price. Moreover, the transaction platform provides both the buyer and the seller more trading opportunities, which can ensure a relatively high success rate, leading to the reduced waste of network resources.

Figure 7:
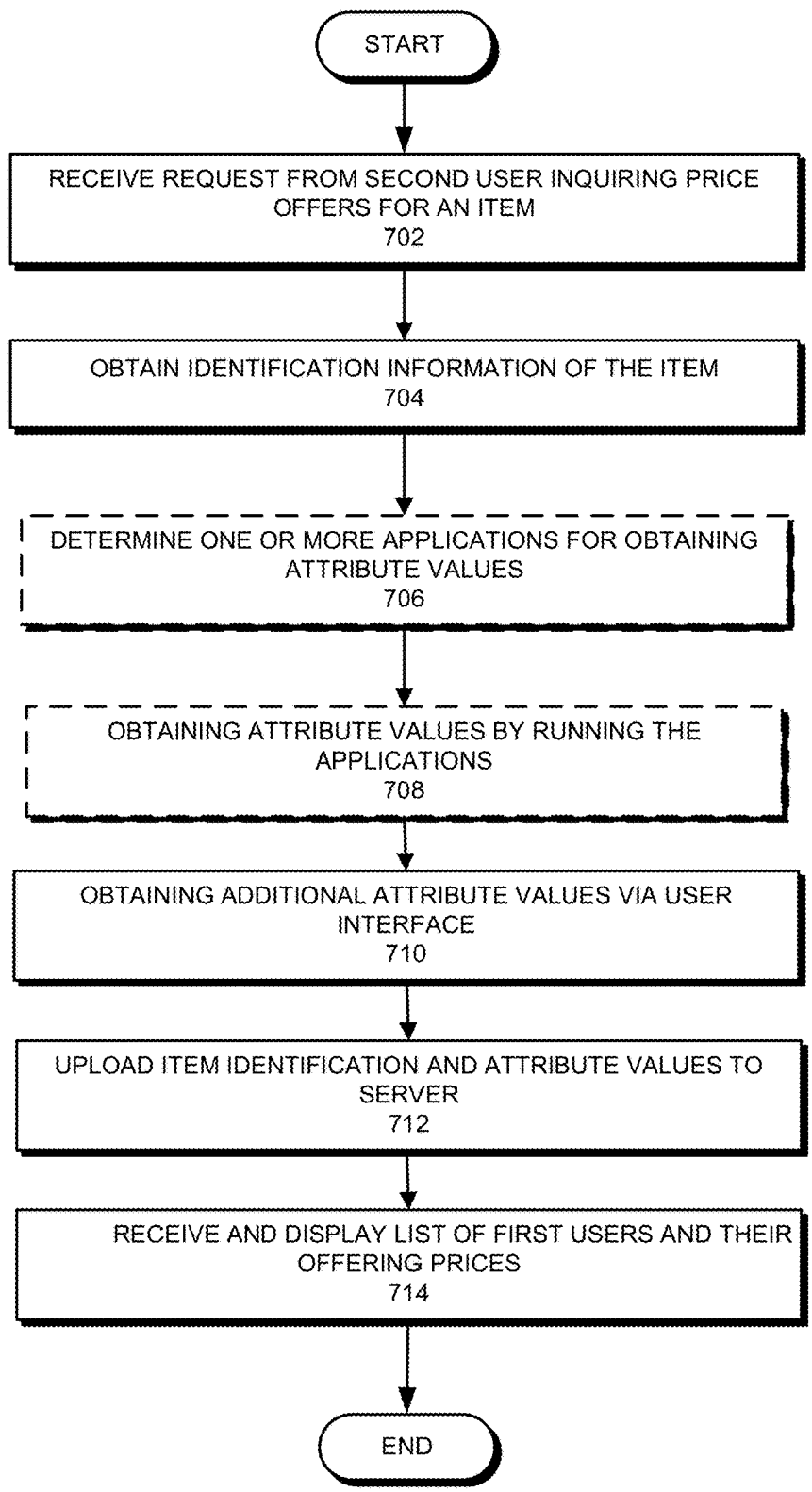
FIG. 7 presents a flowchart illustrating a client process for determining the price of a to-be-recycled item, in accordance with an embodiment of the present invention.

FIG. 7 presents a flowchart illustrating a client process for determining the price of a to-be-recycled item, in accordance with an embodiment of the present invention.

During operation, a client machine receives, from a second user, a request inquiring price offers for a particular to-be-recycled item (operation 702). Such a request may be received through a user interface provided by the client machine to the second user. The client machine then obtains identification information of the item (operation 704). The item identification information may include the category, name, make, model, serial No., etc., of the item. The item identification information is either inputted manually by the second user, or automatically obtained by the system. For example, the second user may install a piece of application software on the item (if the item has an operating system) or on an operating-system-loaded device to which the item is coupled. The application can read certain item identification information and upload such information to the system. Based on the item identification information, the system may optionally determine one or more applications that can be used to automatically obtain values of certain attributes of the item (operation 706). This often applies to cases where the item is an electronic device that can interface either directly or indirectly with the client machine. For example, the electronic device may include a wired interface that can couple to an interface on the client machine via a cable of a certain standard; or the electronic device may include a wireless interface that can couple to the client machine via one or more of: cellular, WiFi®, Bluetooth®, Infrared, etc. Using applications to automatically obtain attribute values releases the second user from the burden of manually inputting such information and ensures fast and accurate results.

In some embodiments, an application database may be established in advance, which stores the corresponding relationship between the item identification information and the application. This corresponding relationship is not necessarily a one-to-one relationship. For example, one application may be able to extract attribute values from multiple types of devices. An entry in the application software database may specify one or more terminal devices that an application can be used to obtain attribute values.

The system then optionally determines, via running the application software, one or more attribute values the item (operation 708). Specifically, the system may first determine whether the application software is installed on the item or a computer to which the item is coupled; if so, the system may run the application to obtain item identification information as well as a number of obtainable attribute values; otherwise, the system may display a message prompting the second user to install the corresponding application software. Alternatively, the system may obtain a download address of an installation file of the application and the second user's permission to download in advance, and directly download the installation file if the system determines that the application is not installed on the item. After installation, the second user can run the application to obtain attribute values.

In addition to attributes whose values may be obtained by running the applications, noticeable attributes specified by the first users may include additional attributes whose values cannot be obtained automatically. In order to obtain those attribute values, the user interface may include a number of option groups, with each option group corresponding to one of the attributes, and each option group includes a number of attribute value options. The client machine can then obtain those attribute values from the second user through the second user making selections in the user interface (operation 710). These attribute options may include comprehensive information associated with the item, such as the channel of purchase, usage time, device configurations, status of failure, overall appearance, etc. The values of these attributes are useful in making a more accurate determination of the overall state of the item, thus laying a good foundation for providing reasonably reasonable price offer for the item.

The client machine then uploads the item identification information and the attribute values to the server (operation 712). Subsequently, the client machine receives, from the server, a list of first users capable of recycling the item and their offer prices for the item, and displays such information on the user interface (operation 714). As discussed previously, the user interface may display the list of first users based on a certain ranking order, and the second user may select, via the user interface, ranking criteria. Moreover, the user interface may include a "sell" button to enable the second user to select a particular first user as the buyer.

As part of the transaction process, the platform needs to authenticate the to-be-recycled item. Note that the authentication process can be performed at various stages during the transaction process, such as at the beginning when the second user is inquiring offer prices or after the second user selecting a first buyer. As discussed previously, authentication of an item may involve running a hardware testing or detection application on the item (if the item has an operating system) or on a computer to which the item is connected.

In some embodiments, the authentication process is performed by the client machine of the second user. To do so, the client machine first needs to determine a test tool capable of testing performance and obtaining values of one or more attributes of the item. Note that, in addition to the current application of a transaction platform, using a test tool to obtain attribute values can also be useful for other situations. For example, when a device fails, one may want to obtain specific parameter values to find out the cause of the failure. Moreover, after maintenance or repair procedures, one may need to retest the attribute values in order to compare the before and after parameters.

In real life, there may be specialized test tools that are capable testing attribute values of PCs and various accessories thereof, but are unknown to the general public. In addition, many specialized testing tools are dedicated to the testing of devices of certain categories. For example, certain tools are used for testing PCs only, while other tools are used for testing mobile devices only. Although these dedicated tools can obtain more accurate attribute values, or attribute values that undetectable by other generic tools, the general public may not know how to choose an appropriate dedicated tool for testing his device, thus resulting in the low utilization rate of those dedicated tools, which is a waste of resources. On the other hand, embodiments of the present invention can provide a solution for determining the right testing tool.

Figure 8:
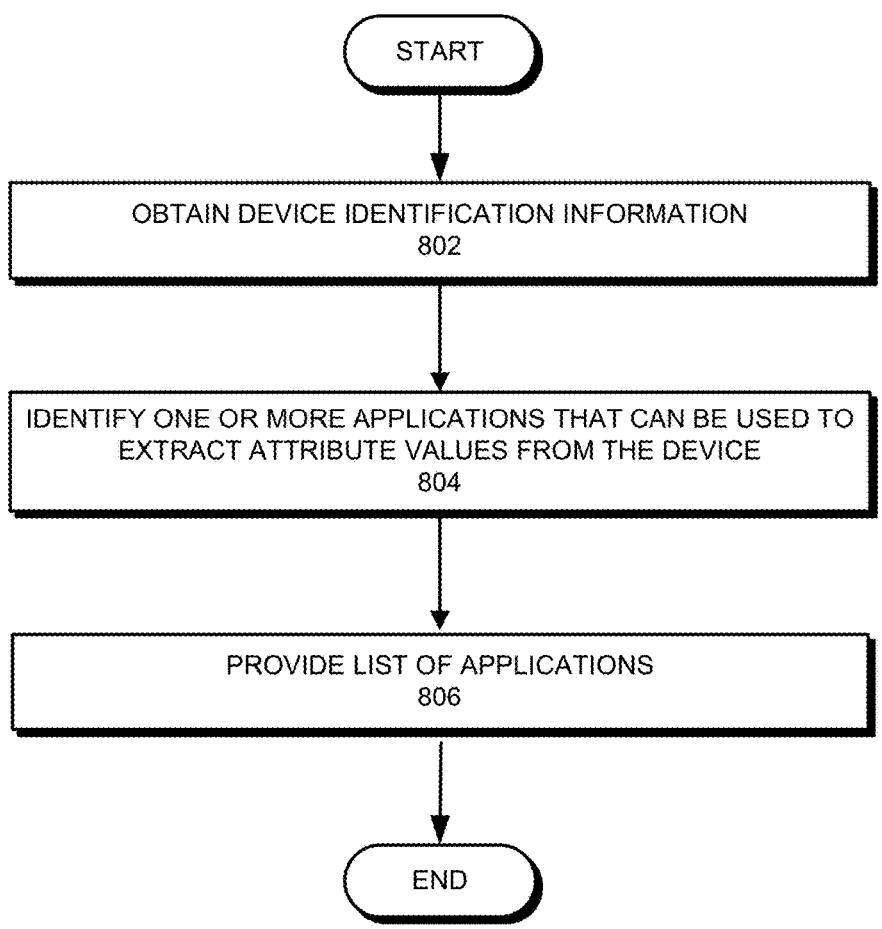
FIG. 8 presents a flowchart illustrating an exemplary process of determining attribute values of a device, in accordance with an embodiment of the present invention.

FIG. 8 presents a flowchart illustrating an exemplary process of determining attribute values of a device, in accordance with an embodiment of the present invention. During operation, the system may obtain the identification information of a device (operation 802). Note that, to allow a testing tool to automatically obtain its attribute values, the device should be machine-accessible, which means either the device itself has an operating system and has a network interface, or the device can interface with another device that is loaded with an operating system and/or network interface. The machine accessible device can include, but is not limited to: personal computers (PCs), all-in-one PCs, laptop computers, tablet computers, mobile phones, displays, printers, projectors, cameras, video cassette recorders, etc. Moreover, with the implementation of Internet of Things, many home appliances are now loaded with operating systems and capable of accessing the Internet. Such smart appliances can include but are not limited to: smart refrigerators, washing machines, air conditioners, televisions (which may include an operating system), etc.

In some embodiments, before determining the item identification information, the second user may specify a machine-accessible device from which the system can extract attribute values of the item. The identification information of the device may be provided by the user when he submits the price-inquiring request, or the client machine may prompt the user to submit the device identification information while receiving the request for obtaining attributes. If the attributes are to be extracted from a current device accessible by the client machine or from other devices connected to the current device, the client machine is also able to extract the identification information of the item through the application software, as long as the user specifies the device from which the attributes are extracted. Once installed on a device, certain applications may be able to extract identification information, such as name, brand, model and the like of the device as well as those of the accessories and other devices connected to the device. For example, certain applications installed on a PC is able to acquire identification information, such as names, brands, models and the like, of various built-in hardware modules (such as the motherboard, processor, memory, graphic card, etc.) contained in the mainframe of the PC. In addition, the application may also obtain identification information of various external hardware modules attached to the mainframe, such as the display, keyboard and the like. Moreover, identification information of certain devices may be acquired by scanning the graphic codes attached to the devices by their manufacturers.

Subsequently, the system identifies, by querying a prior-established application database, one or more applications that can be used to extract attribute values from the device (operation 804). The application database stores the corresponding relationship between the item identification information and the applications. This corresponding relationship is not necessarily a one-to-one relationship. For example, a same application may be able to detect attribute values of multiple types of devices. An entry in the application software database may specify one or more terminal devices that an application can be used to obtain attribute values. Consequently, the system can query the application database to obtain a list of applications corresponding to the type of the device.

The application database entry for a particular piece of application software may also include the installation package or the download address of an installation package for the application. FIG. 9A presents a diagram illustrating exemplary entries in the application software database, in accordance with an embodiment of the present invention. Note that, in the example shown in FIG. 9A, there is a one-to-one corresponding relationship between the application and the device, and the applications are identified by their IDs. In practice, such corresponding relationship can be one-to-many or many-to-one. FIG. 9B presents a diagram illustrating exemplary entries in the application software database, in accordance with an embodiment of the present invention. In FIG. 9B, the database entry includes the download address of the applications. FIG. 9C presents a diagram illustrating exemplary entries in the application software database, in accordance with an embodiment of the present invention. In FIG. 9C, the database entry includes both the IDs of the applications and their download address.

Now return to FIG. 8. The system provides, to the second user, the list of applications for obtaining attribute values (operation 806). If the application has been installed, the second user can directly run the application to obtain the attribute values; otherwise, the second user may need to download and then install such applications. Note that, if the database entry includes the installation package or a download address of the installation package, the system may provide the installation package or the download address to the second user, to allow the second user to download and install the application.

The download address in the application database may be provided by the developer of the application or by various software download platforms. In some embodiments, the server of the transaction platform may have downloaded the installation package in advance, and the download address may be an address directed to the server. In summary, the system may directly provide the download address, which can be in the form of a clickable link, of the installation package to the second user, and the second user can then be directed to a corresponding download page by clicking the link.

In practice, the device whose attributes are inquired can be the current device (i.e., the device used for sending the attribute-inquiring request) or the accessories thereof. For example, a user can use a mobile phone to send a request to the server for acquiring the attribute values of the mobile phone, or the user can use a PC to send a request for acquiring parameters of the hard disk of the PC, etc. Alternatively, the device may also be a different device connected to the current terminal device. For example, a user may use a PC (the current device) to send the request of acquiring attribute values of devices connected to the PC, such as a display, a printer, a projector, etc. Under these conditions, the user may directly install the application software in the current device and then run the application to acquire the requested attribute values. In this case, before the download address of the installation package of the application software is provided, the system may determine whether the application software is already installed in the current device. If so, the system may prompt the user to acquire the attribute values using the already installed application. If not, the system may prompt the user to install the application software, and provide the download address of the installation package.

In summary, some embodiments of the present application provide a system for obtaining, via software applications, attribute values of electronic devices. More specifically, during operation, after receiving the identification information of a device, the system queries a prior-established application database to identify one or more applications that can be used to detect the attribute values of the device, and returns the result to the user. The user can download and install the appropriate application to obtain the attribute values. Such an approach also ensures that the application software is effectively applied.

In the example shown in FIG. 8, the application software is provided to the user, and the user manually performs operations such as downloading, installing, testing and the like, to obtain the attribute values of the device. As discussed previously, the user needs to specify the machine-accessible device, from which the system extracts attributes. The device (may also be called the device-under-test) may also be the current device (i.e., the device used for sending the request), or accessories thereof. Alternatively, the device-under-test may also be other devices connected to the current device. In both cases, the application software with an attribute-test function may be directly operated on the current device to acquire the attribute values of the device-under-test. In addition, operations of obtaining attribute values are executed by the application installed in the current device. In some operating environments, different applications may call each other. For example, an application installed on a device, such as the application for the transaction platform, may call another application with an attribute-test function in order to obtain the attribute values of a device-under-test and provide the obtained attribute values to the user.

Figure 10:
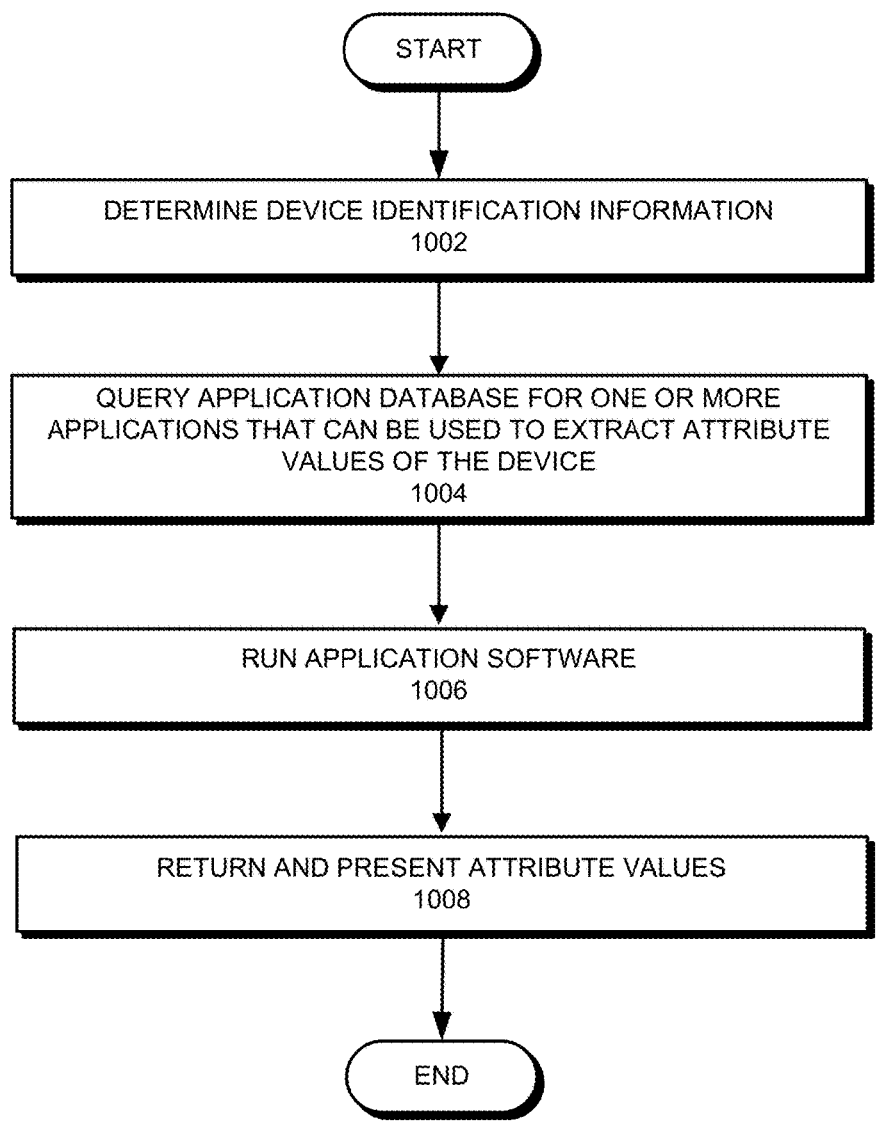
FIG. 10 presents a diagram illustrating an exemplary process of obtaining attribute values, in accordance with an embodiment of the present invention.

FIG. 10 presents a diagram illustrating an exemplary process of obtaining attribute values, in accordance with an embodiment of the present invention. During operation, the system determines the identification information of the device (operation 1002). The system then queries an application software database for applications that can be used to detect attribute values of the device (operation 1004). In some embodiments, the system may present, in the user interface, a device list, which may include the current device, as well as its components (e.g., a hard disk, a memory, a motherboard, a graphic card and the like, and may further include other accessories (e.g., a displays, a keyboard, a mouse, a printer, a scanner and the like) connected to the current device in traditional wired or wireless manners. The device list may further include other "smart" devices (e.g., smart phones, smart televisions and the like) that are connected to the current device via novel protocols, such as DLNA (Digital Living Network Alliance), Airplay and the like. If the user attempts to obtain attributes values for a device on the list, the user may directly select the device from the list; otherwise, the user may need to send requests from other operational entry point. Correspondingly, if the user selects a device from the list, it indicates that the device-under-test is the current device, the accessories thereof, or other devices connected to the current device. The system can also obtain the identification information of the device. The operation for querying the application database is similar to operation 804 shown in FIG. 8.

The system then run the application software to acquire the value of at least one attribute of the device-under-test (operation 1006). In some embodiments, running the application software involves the current application, such as the transaction-platform application, calling the application software for extracting attribute values. The system retunes the acquired attribute values to current transaction-platform application, which can then presents the attribute values to the user (operation 1008).

Figure 11:
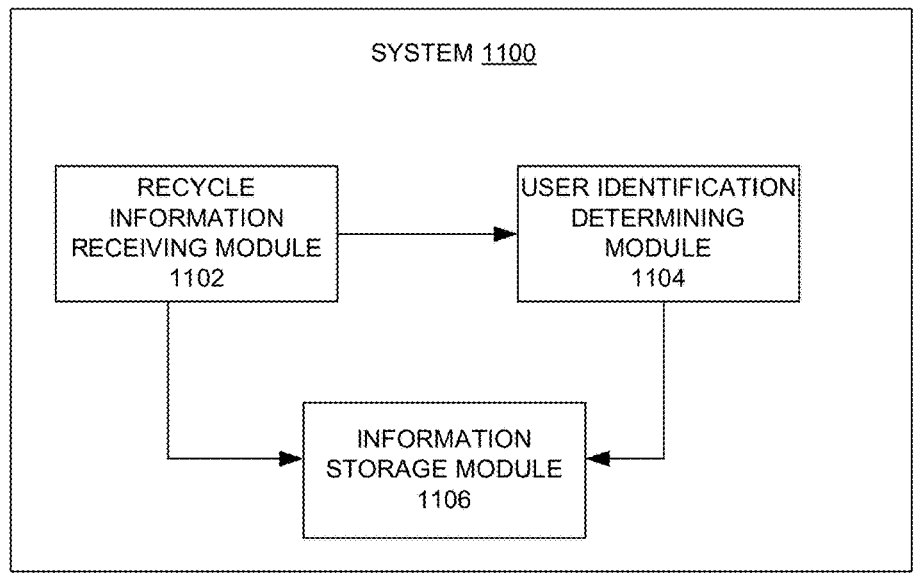
FIG. 11 present a diagram illustrating an exemplary system for establishing a commodity object recycling information database, in accordance with an embodiment of the present invention.

FIG. 11 present a diagram illustrating an exemplary system for establishing a commodity object recycling information database, in accordance with an embodiment of the present invention. In FIG. 11, system 1100 includes a recycle information receiving module 1102, a user identification determining module 1204, and an information storage module 1106. Recycle information receiving module 1102 is configured to receive recycling information of a to-be-recycled item submitted by a client machine of a first user. The recycle information includes the identification information and price information of the to-be-recycled item, and the price information includes noticeable attributes and attribute-specific price information corresponding to each attribute value. User identification determining module 1104 is configured to determine the identification information of the first user. Information storage unit module 1106 is configured to store the corresponding relationship between the identification information of the first user and the recycle information of the to-be-recycled item in a recycling information database. The recycle information database can later be used to determining the offer price for a for-sale item provided by a second user.

To facilitate the first users in providing the recycling information, in some embodiments, the recycling information receiving module 1202 may further include a user-interface-providing subunit, which is configured to provide a user interface to the first user at a client machine. The user-interface-providing subunit may include an item-identification determining subunit, configured to determine the identification information of to-be-recycled item; a categorization subunit, configured to determine the category of the item according to its identification information; and an interface configuration subunit. The interface configuration subunit is configured to determine noticeable attributes and selectable attribute values base on the item category, and send the user interface to the client device of the first user, thus allowing the user interface to be configured to display the determined noticeable attributes and corresponding selections of values.

The price information further includes a baseline price and attribute-specific price-adjusting information, which can include judging conditions or price-adjusting factors. The user interface further includes input fields for inputting the baseline price and one or more price-adjusting factors.

The recycle information receiving module 1102 may include a baseline price receiving subunit, configured to receive a baseline price inputted by the first user; a price-adjusting information receiving subunit, configured to receive the price-adjusting direction and amplitude information provided by the first user; a formula generating subunit, configured to generate attribute-specific price-calculation formula.

Information storage unit 1106 can be configured to store the corresponding relationship among the identification information of the first user, the item identification information, and the baseline price and the attribute-specific price information in the recycling information database.

In addition, system 1106 may further include an item identification information determining unit, which is configured to determine the identification information of the to-be-recycled item; a database inquiring unit, which is configured to inquire the recycle information database based on the item identification information to obtain price information provided by other first users; and a price-recommendation unit, configured to provide price recommendations to the current first user based on price information provided by other first users.

The recycle information may further include price-update condition and update rules, which are associated with time or price changes of the item. Note that the price change may be determined based on the price of similar items (pre-owned or new) that are traded on this transaction platform or other types of trading platforms. The system may further include a monitoring unit, configured to monitor the time or item price changes; and an update unit, configured to update the price in response to the price-update condition being satisfied. The system further may include a prompting unit, configured to prompt the user to update the price information stored in the recycle information database if a preset price-update condition is satisfied.

Figure 12:
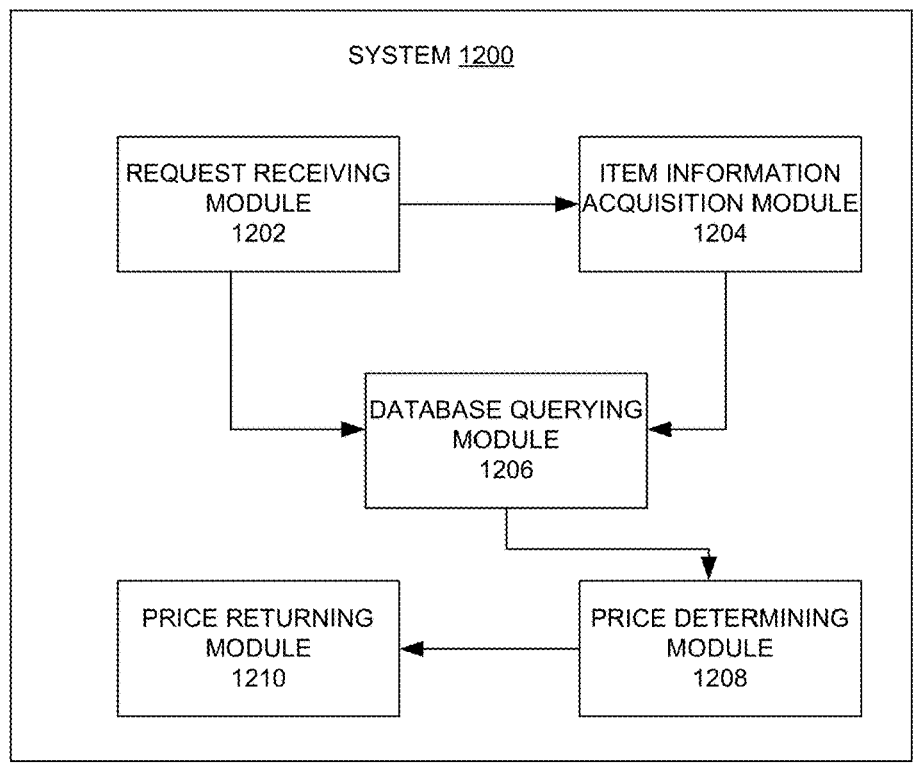
FIG. 12 presents a diagram illustrating an exemplary system for determining the price of a pre-owned merchandise item, in accordance with an embodiment of the present invention.

FIG. 12 presents a diagram illustrating an exemplary system for determining the price of a pre-owned merchandise item, in accordance with an embodiment of the present invention. The system includes a requesting receiving module 1202, an item information acquisition module 1204, a database querying module 1206, a price-determination module 1208, and a price returning module 1210. Request receiving module 1202 is configured to receive, from a client machine of a second user, a request for determining the price of an item. Item information acquisition module 1204 is configured to acquire the identification information and the value of at least one attribute of the item. Database querying module 1206 is configured to query a recycle information database for a set of targeted first users capable of recycling the item based on the item identification information and attribute values. Price determining 1208 is configured to determine the offer prices for the item provided by the targeted first users based on the attribute values and the price information provided by the targeted first users. Price returning module 1210 is configured to return the list of the targeted first target users and their offer prices for the item to the client machine of the second user, thus enabling the second user to determine the sale price of the item and/or select a buyer.

The price information stored in the recycle information database further includes a baseline price and attribute-specific price information. The database querying module 1206 may further include a price information determining unit, configured to determine the baseline prices and attribute-specific price-adjusting factors provided by the targeted first users. Both the baseline price and the attribute-specific price-adjusting factors are used in the price-calculation formula for calculation of the offer price. The price determining module 1208 may be configured to substitute the attribute-specific price-adjusting factors into the price calculation formula to calculate the offer price in combination with the baseline price.

Item information acquisition module 1204 may further include a user-interface-providing subunit configured to provide a user interface at the client machine of the second user. The user-interface-providing subunit may include a first user determining subunit, configured to determine a set of first users capable of recycling the item based on the item identification information; an attribute determining subunit, configured to combine noticeable attributes from all identified first users to form an attribute set; and an option group determining subunit, configured to determine the option groups to be presented in the user interface according to the attribute set.

If the item is a machine-accessible device, the item information acquisition module 1204 may specifically include a subunit for identifying one or more application software that can be used to detect the attribute values of the device, and a subunit for providing the detected application list to the second user to enable the second user to obtain attribute values using the software.

The user-interface-providing subunit is further configured to provide at least one option group that enables the second user to input other non-machine-detectable attributes.

In order to ensure the information submission accuracy and to reduce the information-input burden of the second user, the user-interface-providing subunit may further include an association relationship determination unit configured to, after receiving a value selection for an option group, determining whether a target option group associated with the option group exists, and if so, disable or disable one of more option values of the target option group.

In addition, user-interface-providing subunit may further include a ranking unit, configured to rank the first target users based on historical trading data, and/or the user evaluations.

Moreover, system 1200 may further include a test unit. The test unit is configured to test the performance of a specific hardware module, such as a CPU, a memory, a graphic card, etc., of the item and to verify the authenticity of the item based on the test result.

Figure 13:
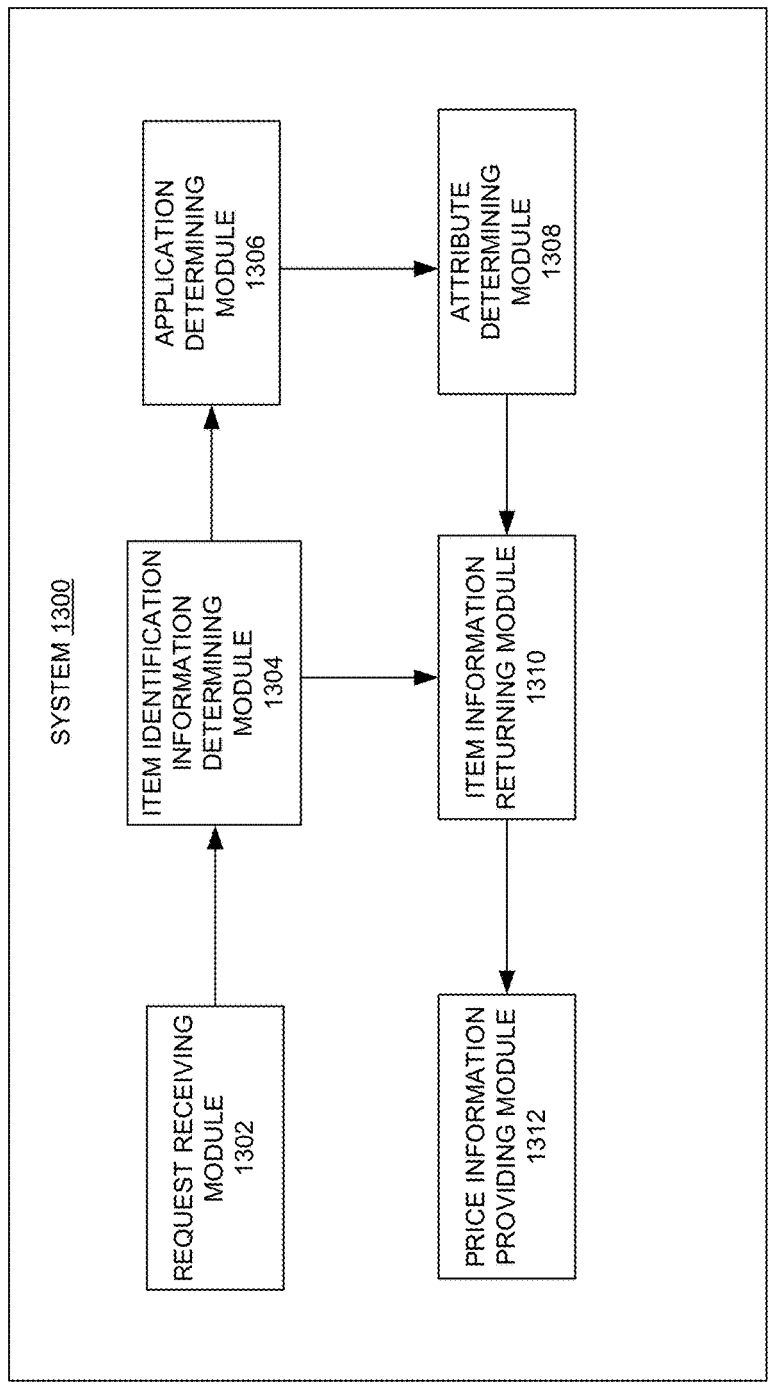
FIG. 13 presents a diagram of an exemplary system for determining price information of a to-be-recycled item, in accordance with an embodiment of the present invention.

FIG. 13 presents a diagram of an exemplary system for determining price information of a to-be-recycled item, in accordance with an embodiment of the present invention. In FIG. 13, system 1300 include a request receiving module 1302, an item identification information determining module 1304, an application determining module 1306, an attribute determining module 1308, an item information uploading module 1310, and a price information providing module 1312.

Request receiving module 1302 is configured to receive, from a second user, a request for determining the price information of a pre-owned item. Item identification information determining module 1304 is configured to determine the identification information of the item. Application determining module 1306 is configured to identify on or more software applications that can be used to determine attribute values of the item. Attribute value determining module 1308 is configured to determine the attribute values using the application software. Item information uploading module 1310 is configured to upload the identification information and the attribute values of the item to a server, thus enabling the server to identify a set of targeted first users capable of recycling the item, and to determine and return their offer prices to the item. Price information providing module is configured to provide the price information returned by the server to the second user.

The systems illustrate in FIGS. 11-13 are merely exemplary, and are not intended to limit the scope of the claimed invention. Various modules shown as separate components may or may not be separated physically, components displayed as modules may or may not be physical modules, namely, they may be located in one place, or may be distributed over a plurality of network nodes. A part or all of the modules may be selected to achieve the purposes of the solutions in the embodiments according to actual demand.

Computer and Communication System

Figure 14:
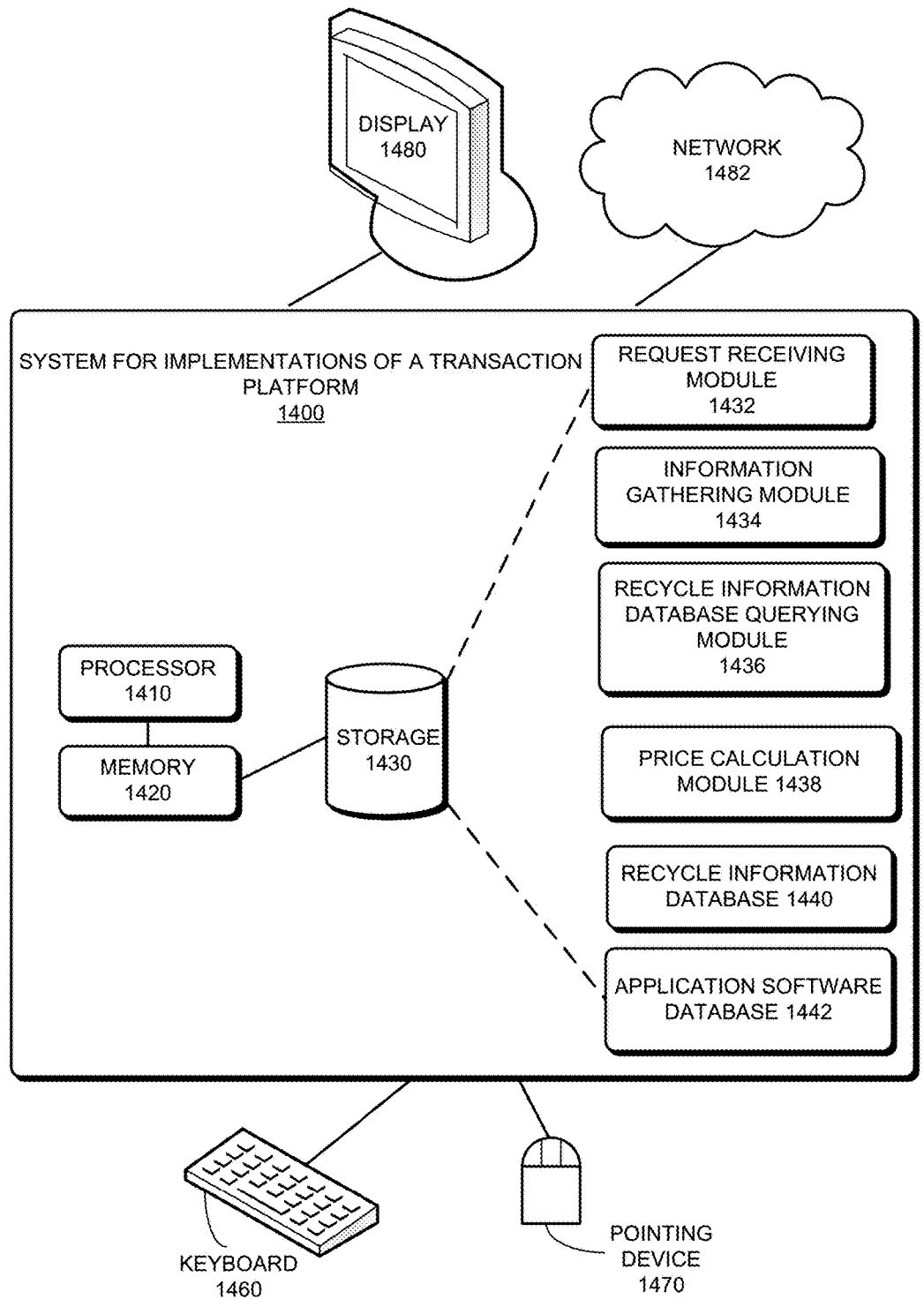
FIG. 14 illustrates an exemplary system for implementations of a transaction platform, in accordance with an embodiment of the present invention.

FIG. 14 illustrates an exemplary system for implementing a transaction platform, in accordance with an embodiment of the present invention. A system 1400 for implementations of a transaction platform comprises a processor 1410, a memory 1420, and a storage 1430. Storage 1430 typically stores instructions that can be loaded into memory 1420 and executed by processor 1410 to perform the methods mentioned above. In one embodiment, the instructions in storage 1430 can implement a request receiving module 1432, an information gathering module 1434, a recycle information database querying module 1436, and a price calculation module 1438, all of which can be in communication with each other through various means. Storage 1430 can further comprise a number of data structures, such as a recycle information database 1440 and an application software database 1442.

In some embodiments, modules 1432, 1434, 1436, and 1438 can be partially or entirely implemented in hardware and can be part of processor 1410. Further, in some embodiments, the system may not include a separate processor and memory. Instead, in addition to performing their specific tasks, modules 1432, 1434, 1436, and 1438, either separately or in concert, may be part of general- or special-purpose computation engines.

Storage 1430 stores programs to be executed by processor 1410. Specifically, storage 1430 stores a program that implements a system (application) for the transaction platform. During operation, the application program can be loaded from storage 1430 into memory 1420 and executed by processor 1410. As a result, system 1400 can perform the functions described above. System 1400 can be coupled to an optional display 1480 (which can be a touchscreen display), keyboard 1460, and pointing device 1470, and can also be coupled via one or more network interfaces to network 1482.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

What is claimed is:

1. A computer-executable method for facilitating trading of pre-owned items, the method comprising:
   receiving, at a server over a computer network, recycle information associated with an item that a first user intends to purchase, wherein the recycle information specifies the first user, item identification information, and price information associated with the item, and wherein the price information is specific to a set of predetermined attributes associated with the item;
   storing the recycle information in a database;
   receiving, at the server over the computer network, a request for an offer price for a for-sale item that a second user intends to sell;
   in response to the for-sale item being machine-accessible, causing an application on a client machine associated with the second user to extract, directly from the for-sale item, attribute values specific to the for-sale item corresponding to the set of predetermined attributes;
   querying the database to identify one or more users who intend to purchase the for-sale item based on the corresponding item identification information;
   calculating offer prices provided by the identified users for the for-sale item based on the corresponding price information and the extracted attribute values; and
   providing a list of the identified users and the calculated offer prices associated with the for-sale item to the second user.

2. The method of claim 1, wherein the price information associated with the item includes a baseline price and attribute-specific price information associated with at least one attribute of the item, and wherein the attribute-specific price information includes one of: a binary judging condition and a numeric price-adjusting factor.

3. The method of claim 2, wherein the price information further includes a price-calculation formula, and wherein calculating an offer price for an item with specific attribute values involves substituting appropriate price-adjusting factors corresponding to the specific attribute values in the price-calculation formula.

4. The method of claim 1, wherein receiving the recycle information further comprises:
   receiving, via a user interface provided to the first user, an option selected from at least one option group presented on the user interface, wherein the option group corresponds to an attribute, and wherein the option selection corresponds to a specific value of the attribute; and
   receiving, from the first user, a price-adjusting input corresponding to the selected option.

5. The method of claim 1, wherein calculating offer prices provided by the identified users involves:
   for each identified user,
   obtaining, from the database, price information provided by the identified user, wherein the price information includes a baseline price and a price-adjusting factor that is specific to at least one extracted attribute value; and
   calculating an offer price provided by the identified user based on both the baseline price and the price-adjusting factor.

6. The method of claim 1, wherein providing the list of the identified users further comprises ranking the identified users.

7. The method of claim 1, further comprising:
   assembling the set of predetermined attributes based on noticeable attributes specified by the identified users; and
   determining a set of option groups to be presented on a user interface for the second user, wherein a respective option group corresponds to a noticeable attribute, and wherein options within the option group correspond to possible values of the noticeable attribute, thereby facilitating the second user to specify a value of the noticeable attribute for the for-sale item.

8. A computer server system for providing a transaction platform that facilitates trading of pre-owned items, the computer server system comprises:
   a processor;

an information-receiving mechanism configured to receive, over a computer network, recycle information associated with an item that a first user intends to purchase, wherein the recycle information specifies the first user, item identification information, and price information associated with the item, and wherein the price information is specific to a set of predetermined attributes associated with the item;

a database configured to store the recycle information;

a request-receiving mechanism configured to receive, over the computer network, a request for an offer price for a for-sale item that a second user intends to sell;

an attribute-extraction mechanism configured to, in response to the for-sale item being machine-accessible, cause an application on a client machine associated with the second user to extract, directly from the for-sale item, attribute values specific to the for-sale item corresponding to the set of predetermined attributes;

a querying mechanism configured to query the database to identify one or more users who intend to purchase the for-sale item based on the corresponding item identification information;

a calculation mechanism configured to calculate offer prices provided by the identified users for the for-sale item based on the corresponding price information and the extracted attribute values; and a providing-mechanism configured to provide a list of the identified users and the calculated offer prices associated with the for-sale item to the second user.

9. The computer server system of claim 8, wherein price information associated with the item includes a baseline price and attribute-specific price information associated with at least one attribute of the item, and wherein the attribute-specific price information includes one of: a binary judging condition and a numeric price-adjusting factor.

10. The computer server system of claim 8, wherein receiving the recycle information further comprises:
    receiving, via a user interface provided to the first user, an option selected from at least one option group presented on the user interface, wherein the option group corresponds to an attribute, and wherein the option selection corresponds to a specific value of the attribute; and
    receiving, from the first user, a price-adjusting input corresponding to the selected option.

11. The computer server system of claim 8, wherein while providing the list of the identified users, the providing mechanism is configured to rank the identified users.

12. The computer server system of claim 8, further comprising a user interface providing mechanism configured to:
    assemble the set of predetermined attributes based on noticeable attributes specified by the identified users;
    determine a set of option groups; and
    provide a user interface for the second user, wherein the user interface presents the determined set of option groups, wherein a respective option group corresponds to a noticeable attribute, and wherein options within the option group correspond to possible values of the noticeable attribute, thereby facilitating the second user to specify a value of the noticeable attribute for the for-sale item.

13. A non-transitory computer-readable storage medium storing instructions that when executed by a computing device cause the computing device to perform a method for providing a transaction platform that facilitates buying or selling of pre-owned items, the method comprising:
    receiving, at a server over a computer network, recycle information associated with an item that a first user intends to purchase, wherein the recycle information specifies the first user, item identification information, and price information associated with the item, and wherein the price information is specific to a set of predetermined attributes associated with the item;
    storing the received recycle information n a database;
    receiving, at the server over the computer network, a request for an offer price for a for-sale item that a second user intends to sell;
    in response to the for-sale item being machine-accessible, causing an application on a client machine associated with the second user to extract, directly from the for-sale item, attribute values specific to the for-sale item corresponding to the set of predetermined attributes;
    querying the database to identify one or more users who intend to purchase the for-sale item based on the corresponding item identification information;
    calculating offer prices provided by the identified users for the for-sale item based on the corresponding price information and the extracted attribute values; and
    providing a list of the identified users and the calculated offer prices associated with the for-sale item to the second user.

14. The computer-readable storage medium of claim 13, wherein the price information associated with the item includes a baseline price and attribute-specific price information associated with at least one attribute of the item, and wherein the attribute-specific price information includes one of: a binary judging condition and a numeric price-adjusting factor.

15. The computer-readable storage medium of claim 13, wherein receiving the recycle information further comprises:
    receiving, via a user interface provided to the first user, an option selected from at least one option group presented on the user interface, wherein the option group corresponds to an attribute, and wherein the option selection corresponds to a specific value of the attribute; and
    receiving, from the first user, a price-adjusting input corresponding to the selected option.

16. The computer-readable storage medium of claim 13, wherein providing the list of the identified users further comprises ranking the identified users.

17. The computer-readable storage medium of claim 13, wherein the method further comprises:
    assembling the set of predetermined attributes based on noticeable attributes specified by the identified one or more users; and
    determining a set of option groups to be presented on a user interface for the second user, wherein a respective option group corresponds to a noticeable attribute, and wherein options within the option group correspond to possible values of the noticeable attribute, thereby facilitating the second user to specify a value of the noticeable attribute for the for-sale item.

* * * * *